(12) United States Patent
Chen et al.

(10) Patent No.: US 12,316,415 B2
(45) Date of Patent: May 27, 2025

(54) WIRELESS COMMUNICATION METHOD AND DEVICE AND COMMUNICATION SYSTEM

(71) Applicant: FUJITSU LIMITED, Kawasaki (JP)

(72) Inventors: Zhe Chen, Beijing (CN); Lei Song, Beijing (CN); Qinyan Jiang, Beijing (CN); Lei Zhang, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 325 days.

(21) Appl. No.: 17/883,787

(22) Filed: Aug. 9, 2022

(65) Prior Publication Data

US 2022/0393739 A1 Dec. 8, 2022

Related U.S. Application Data

(63) Continuation of application No. PCT/CN2020/075108, filed on Feb. 13, 2020.

(51) Int. Cl.
*H04B 7/06* (2006.01)
*H04B 1/18* (2006.01)
(Continued)

(52) U.S. Cl.
CPC ......... *H04B 7/0626* (2013.01); *H04L 1/1812* (2013.01); *H04L 27/26025* (2021.01); *H04W 72/23* (2023.01)

(58) Field of Classification Search
CPC . H04L 5/0098; H04L 5/001; H04L 27/26025; H04W 72/0446
See application file for complete search history.

(56) References Cited

U.S. PATENT DOCUMENTS

2014/0301348 A1* 10/2014 Chmiel ............... H04L 5/0098
370/329
2015/0189627 A1 7/2015 Yang et al.
(Continued)

FOREIGN PATENT DOCUMENTS

CN 106105333 A 11/2016
CN 109644352 A 4/2019
(Continued)

OTHER PUBLICATIONS

Extended European search report with the Supplementary European search report and the European search opinion, issued by the European Patent Office for corresponding European Patent Application No. 20918954.7-1213, mailed on Mar. 7, 2023.
(Continued)

*Primary Examiner* — Yee F Lam
(74) *Attorney, Agent, or Firm* — Myers Wolin, LLC

(57) ABSTRACT

A wireless communication method and device and a communication system. The method includes: a terminal equipment receives a downlink data signal at a time unit n, the downlink data signal including activation/deactivation command acting on a secondary cell; and the terminal equipment performs at least one of the following processing: applying corresponding actions not earlier than a time unit n+k+1; applying actions related to a deactivation timer of the secondary cell at the time unit n+k+1; and applying actions related to CSI report after a time unit n+k, the CSI report being related to or corresponding to the activation/deactivation command, and the time unit referring to a time unit corresponding to transmission of an uplink control signal, the uplink control signal carrying HARQ-ACK information corresponding to the downlink data signal.

7 Claims, 14 Drawing Sheets

---

1601
a network device transmits a downlink data signal at a time unit n, the downlink data signal including an activation/deactivation command acting on a secondary cell 1602
the network device receives CSI report after a time unit n+k, wherein, the CSI report is related to or corresponds to the activation/deactivation command, and the time unit referring to a time unit corresponding to reception of an uplink control signal

(51) Int. Cl.
*H04L 1/1812* (2023.01)
*H04L 27/26* (2006.01)
*H04W 72/23* (2023.01)

(56) References Cited

U.S. PATENT DOCUMENTS

| | | | |
|---|---|---|---|
| 2016/0128003 A1 | 5/2016 | Callender et al. | |
| 2016/0255577 A1 | 9/2016 | Kazmi et al. | |
| 2016/0270107 A1 | 9/2016 | Dinan | |
| 2016/0330697 A1* | 11/2016 | Chen | H04W 76/15 |
| 2019/0052422 A1* | 2/2019 | Yin | H04W 72/20 |
| 2020/0336227 A1* | 10/2020 | Takeda | H04B 17/327 |
| 2020/0413478 A1 | 12/2020 | Si et al. | |
| 2021/0120464 A1 | 4/2021 | Shen et al. | |
| 2021/0266902 A1* | 8/2021 | Takeda | H04L 5/0098 |
| 2021/0273771 A1 | 9/2021 | Takeda et al. | |
| 2022/0053522 A1* | 2/2022 | MolavianJazi | H04L 27/26025 |
| 2022/0183034 A1* | 6/2022 | Oh | H04L 5/0057 |

FOREIGN PATENT DOCUMENTS

| | | | |
|---|---|---|---|
| CN | 110166192 A | 8/2019 | |
| CN | 110324856 A | 10/2019 | |
| WO | 2016/144078 A1 | 9/2016 | |
| WO | 2016/149167 A1 | 9/2016 | |
| WO | 2019/182287 A1 | 9/2019 | |
| WO | 2020/008644 A1 | 1/2020 | |
| WO | WO-2020017054 A1 * | 1/2020 | ....... H04L 27/26025 |

OTHER PUBLICATIONS

First Notification of Office Action and search report issued by the China National Intellectual Property Administration for corresponding Chinese Patent Application No. 202080095413.6, mailed on Jun. 22, 2023, with an English translation.

Notice of Reasons for Refusal issued by the Japan Patent Office for corresponding Japanese Patent Application No. 2022-548864, mailed on Jul. 25, 2023, with an English translation.

3GPP TS 38.213 V16.0.0, "3rd Generation Partnership Project; Technical Specification Group Radio Access Network; NR; Physical layer procedures for control (Release 16)", Dec. 2019.

Sony, "UCI enhancements for eURLLC", Agenda Item: 7.2.6.2, 3GPP TSG-RAN WG1 Meeting #97, R1-1906841, Reno, USA, May 13-17, 2019.

International Search Report and Written Opinion of the International Searching Authority issued by the China National Intellectual Property Administration for corresponding International Patent Application No. PCT/CN2020/075108, mailed on Oct. 29, 2020, with an English translation.

Notice of Preliminary Rejection issued by the Korean Intellectual Property Office for corresponding Korean Patent Application No. 10-2022-7027862, mailed on Dec. 12, 2024, with an English translation.

Qualcomm Incorporated, "Offline summary for NR timing ambiguity", Agenda Item: 7.1.3, 3GPP TSG RAN WG1 Meeting #98bis, R1-1911529, Chongqing, China, Oct. 14-20, 2019, cited in KROA.

* cited by examiner

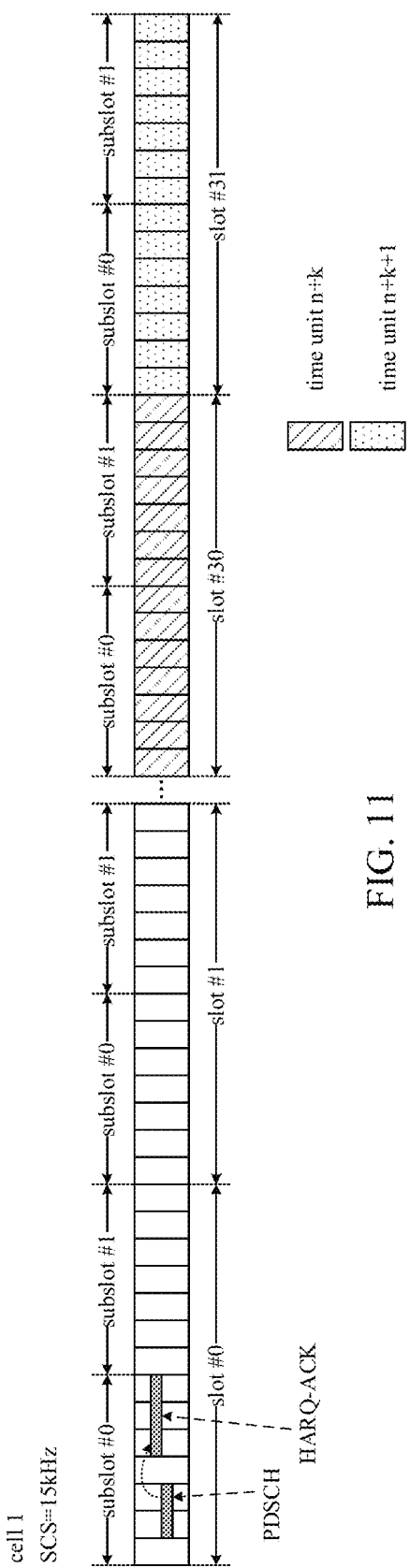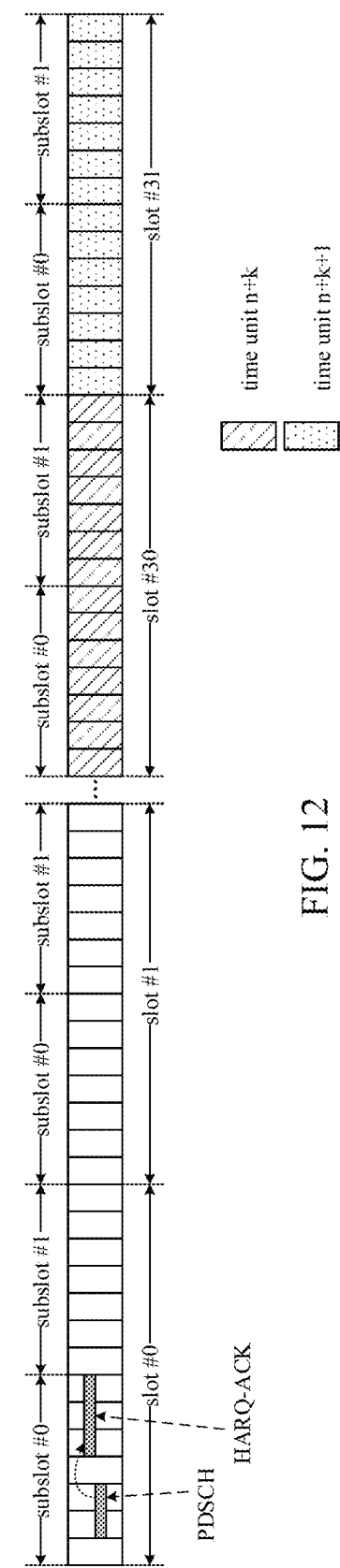
FIG. 11
FIG. 12

WIRELESS COMMUNICATION METHOD AND DEVICE AND COMMUNICATION SYSTEM

CROSS-REFERENCE TO RELATED APPLICATION

This application is a continuation application of International Application PCT/CN2020/075108 filed on Feb. 13, 2020 and designated the U.S., the entire contents of which are incorporated herein by reference.

FIELD

This disclosure relates to the field of communications.

BACKGROUND

In order to meet a requirement of URLLC (ultra reliable low latency communications) services for low latency at the same time, a mechanism of transmitting uplink control signals is enhanced in Rel-16. Specifically, a subslot-based PUCCH (physical uplink control channel) resource indication is introduced. Thus, HARQ-ACK (hybrid automatic repeat acknowledgement) information, CSI (channel state information) information, and SR (sounding reference) signal information may all be reported by this type of PUCCH resources.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that as subslot-based uplink signal transmission is introduced, especially subslot-based PUCCH transmission, the original slot-based indication methods are unable to completely be applicable to indication of subslots, thereby resulting in a series of indication problems.

In order to avoid indication errors or ambiguities, embodiments of this disclosure provide a wireless communication method and device and a communication system.

According to an aspect of the embodiments of this disclosure, there is provided a wireless communication method, including:
- a terminal equipment receives a downlink data signal (PDSCH) at a time unit n, the downlink data signal including an activation/deactivation command acting on a secondary cell; and
- the terminal equipment performs at least one of the following processing:
- applying corresponding actions not earlier than a time unit n+k+1;
- applying actions related to a deactivation timer of the secondary cell at the time unit n+k+1; and
- applying actions related to CSI report after a time unit n+k, wherein, the CSI report is related to or corresponds to the activation/deactivation command,
- the time unit referring to a time unit corresponding to transmission of an uplink control signal, the uplink control signal carrying HARQ-ACK information corresponding to the downlink data signal.

According to another aspect of the embodiments of this disclosure, there is provided a wireless communication method, including:
- a network device transmits a downlink data signal (PDSCH) at a time unit n, the downlink data signal including an activation/deactivation command acting on a secondary cell; and
- the network device receives CSI report after a time unit n+k, the CSI report being related to or corresponding to the activation/deactivation command;
- the time unit referring to a time unit corresponding to reception of an uplink control signal, the uplink control signal carrying HARQ-ACK information corresponding to the downlink data signal.

According to an aspect of the embodiments of this disclosure, there is provided a wireless communication method, including:
- a terminal equipment receives a downlink data signal at a time unit n, the downlink data signal including an activation/deactivation command acting on a secondary cell; and
- the terminal equipment performs at least one of the following processing:
- applying corresponding actions not earlier than a time unit n+k+1;
- applying actions related to a deactivation timer of the secondary cell at the time unit n+k+1; and
- applying actions related to CSI report after a time unit n+k, wherein, the CSI report is related to or corresponds to the activation/deactivation command,
- the time unit referring to a time unit corresponding to transmission of an uplink control signal.

According to another aspect of the embodiments of this disclosure, there is provided a wireless communication method, including:
- a network device transmits a downlink data signal at a time unit n, the downlink data signal including an activation/deactivation command acting on a secondary cell; and
- the network device receives CSI report after a time unit n+k, wherein, the CSI report is related to or corresponds to the activation/deactivation command;
- the time unit referring to a time unit corresponding to reception of an uplink control signal.

According to an aspect of the embodiments of this disclosure, there is provided a wireless communication device, including:
- a receiving unit configured to receive a downlink data signal (PDSCH) at a time unit n, the downlink data signal including an activation/deactivation command acting on a secondary cell; and
- a processing unit configured to perform at least one of the following processing:
- applying corresponding actions not earlier than a time unit n+k+1;
- applying actions related to a deactivation timer of the secondary cell at the time unit n+k+1; and
- applying actions related to CSI report after a time unit n+k, wherein, the CSI report is related to or corresponds to the activation/deactivation command,
- the time unit referring to a time unit corresponding to transmission of an uplink control signal, the uplink control signal carrying HARQ-ACK information corresponding to the downlink data signal.

According to another aspect of the embodiments of this disclosure, there is provided a wireless communication device, including:

a transmitting unit configured to transmit a downlink data signal (PDSCH) at a time unit n, the downlink data signal including an activation/deactivation command acting on a secondary cell; and a receiving unit configured to receive CSI report after a time unit n+k, wherein, the CSI report is related to or corresponds to the activation/deactivation command;

the time unit referring to a time unit corresponding to reception of an uplink control signal, the uplink control signal carrying HARQ-ACK information corresponding to the downlink data signal.

According to an aspect of the embodiments of this disclosure, there is provided a wireless communication device, including:

a receiving unit configured to receive a downlink data signal at a time unit n, the downlink data signal including an activation/deactivation command acting on a secondary cell; and a processing unit configured to perform at least one of the following processing:

applying corresponding actions not earlier than a time unit n+k+1;

applying actions related to a deactivation timer of the secondary cell at the time unit n+k+1; and applying actions related to CSI report after a time unit n+k, wherein, the CSI report is related to or corresponds to the activation/deactivation command, the time unit referring to a time unit corresponding to transmission of an uplink control signal.

According to another aspect of the embodiments of this disclosure, there is provided a wireless communication device, including:

a transmitting unit configured to transmit a downlink data signal at a time unit n, the downlink data signal including an activation/deactivation command acting on a secondary cell; and a receiving unit configured to receive CSI report after a time unit n+k, the CSI report being related to or corresponding to the activation/deactivation command;

the time unit referring to a time unit corresponding to reception of an uplink control signal.

An advantage of the embodiments of this disclosure exists in that according to the embodiments of this disclosure, indication errors or ambiguities of the downlink data signals on activation/deactivation may be avoided.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiments.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings:

FIG. 11 is a schematic diagram of a slot of cell 1;

FIG. 12 is another schematic diagram of the slot of cell 1;

DETAILED DESCRIPTION

Figure 1:
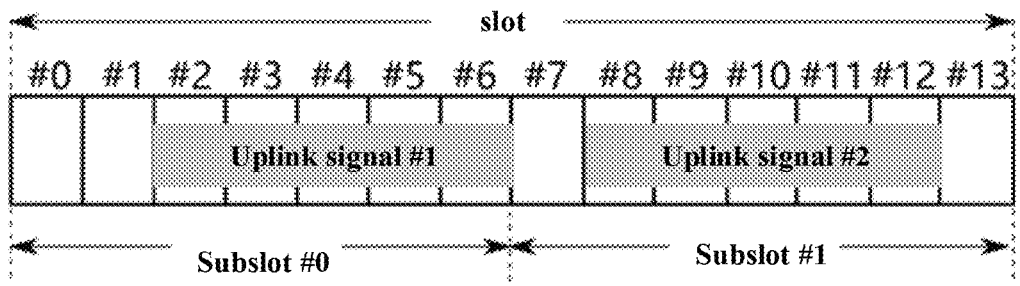
FIG. 1 is schematic diagram of a mode of slot division.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a user equipment to the communication network and provides services for the user equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" refers to, for example, an equipment accessing to a communication network and receiving network services via a network device, and may also be referred to as "a terminal equipment (TE)". The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

In order to make the embodiments of this disclosure clear and easy to be understood, some concepts and definitions concerned in the embodiments of this disclosure shall be described below.

In the embodiment of this disclosure, the subslot-based uplink signal transmission refers to that a terminal equipment transmits an uplink signal at a subslot according to corresponding indication information. Generally speaking, "an uplink signal is transmitted in one subslot" means that at least a starting symbol of the uplink signal is in the sub-slot. Either the starting symbol to an ending symbol of the uplink signal are in the subslot, or the starting symbol of the uplink signal is in the sub-slot, and the ending symbol of the uplink signal is not in the subslot (in a subsequent subslot). In embodiments of this disclosure, description shall be given by taking the former (the starting and ending symbols of the uplink signal are both in the same subslot) as an example.

In embodiments of this disclosure, a time-domain length of a subslot is less than 14 symbols.

Figure 2:
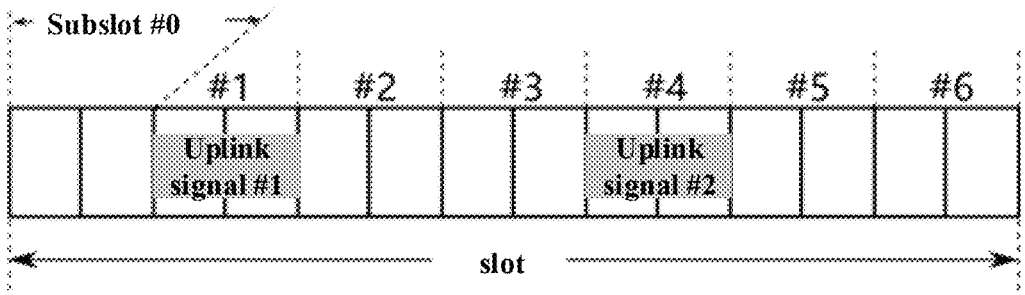
FIG. 2 is a schematic diagram of another mode of slot division.

The terminal equipment receives configuration information (e.g. subslotLengthForPUCCH) transmitted by the network device, the configuration information indicating a length of a subslot corresponding to a subslot-based uplink signal (e.g. PUCCH feedback). Furthermore, the length is in units of symbols. In general, the length of the subslot indicated by the indication information may be of 7 symbols, or 2 symbols. FIG. 1 is schematic diagram of a mode of slot division (corresponding to a subslot length of 7 symbols). As shown in FIG. 1, a 14-symbol slot is divided into two 7-symbol subslots. An uplink signal #1 is transmitted in subslot #0, and an uplink signal #2 is transmitted in subslot #1. FIG. 2 is schematic diagram of another mode of slot division. As shown in FIG. 2 (corresponding to a subslot length of 2 symbols), a 14-symbol slot is divided into seven 2-symbol subslots. An uplink signal #1 is transmitted in subslot #1, and an uplink signal #2 is transmitted in subslot #4.

On the other hand, at present, activation or deactivation of a secondary cell (Scell) is indicated by MAC CE (media access control control element) signaling, the MAC CE signaling being carried in a PDSCH (physical downlink shared channel), and the terminal equipment may determine time points for subsequent actions with reference to a slot corresponding to PUCCH transmission, for example, the terminal equipment receives a PDSCH at a time unit n, the PDSCH includes an activation or deactivation signaling for a secondary cell, and the PDSCH ends at a slot n, the terminal equipment may, apply the corresponding actions, such as corresponding actions of activation or deactivation of a secondary cell, not earlier than the time unit n+k+1; and/or, apply an action related to a deactivation timer of the secondary cell at a time unit n+k+1; and/or, apply an action related to CSI report after the time unit n+k, such as applying an action related to CSI report at a time unit after the time unit n+k, the time unit referring to an earliest time slot in time slots when (at which) the CSI report is active.

The k is obtained through calculation by the following formula:

$$k = k_1 + 3N_{slot}^{subframe,\mu};$$

where, $N_{slot}^{subframe,\mu}$ refers to the number of slots contained in each subframe when an SCS (subcarrier spacing) corresponding to the transmission of the uplink control signal (such as PUCCH transmission) is configured as $\mu$, and $k_1$ is indicated by a PDSCH-to-HARQ_feedback timing indicator field in scheduling DCI corresponding to the PDSCH.

It was found by the inventors that when the terminal equipment receives the PDSCH including the SCell activation signaling at a slot n, corresponding terminal actions needed to be performed at the slot n+k+1 or not earlier than the slot n+k+1. However, when the terminal equipment is configured with subslot-based PUCCH configuration information (such as subslotLengthForPUCCH), a unit corresponding to $k_1$ is a subslot, but not a slot, which results in that k is unable to be expressed correctly, thereby leading to that the system is unable to operate.

In order to avoid the situation in which the time point at which the terminal actions take effect is not indicated clearly, the method of the embodiment of this disclosure is proposed.

Various implementations of this disclosure shall be described below with reference to the accompanying drawings. These implementations are illustrative only, and are not intended to limit this disclosure.

Embodiment of a First Aspect

Figure 3:
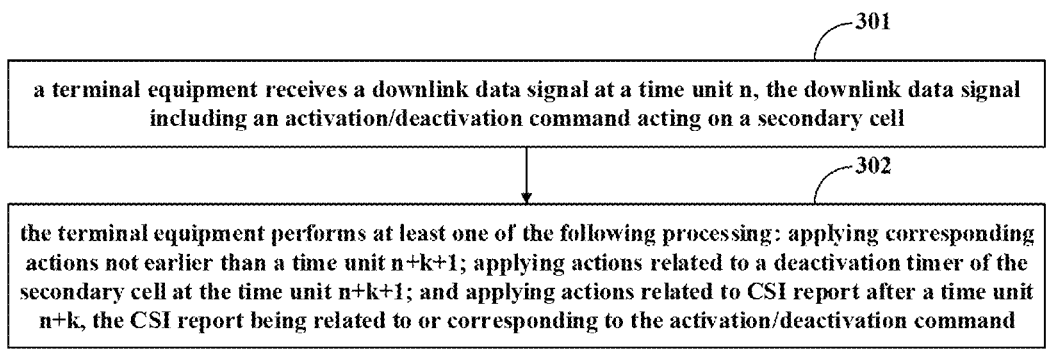
FIG. 3 is a schematic diagram of the wireless communication method of the embodiment of the first aspect of this disclosure.

The embodiment of the first aspect of this disclosure provides a wireless communication method, which shall be described from a terminal equipment side. FIG. 3 is a schematic diagram of the wireless communication method of the embodiment of this disclosure. As shown in FIG. 3, the method includes:

301: a terminal equipment receives a downlink data signal at a time unit n, the downlink data signal including an activation/deactivation command acting on a secondary cell; and

302: the terminal equipment performs at least one of the following processing: applying corresponding actions not earlier than a time unit n+k+1; applying actions related to a deactivation timer of the secondary cell at the time unit n+k+1; and applying actions related to CSI report after a time unit n+k, the CSI report being related to or corresponding to the activation/deactivation command.

In the embodiment of this disclosure, the time unit refers to a time unit corresponding to transmission of an uplink control signal, the uplink control signal carrying HARQ-ACK information corresponding to the downlink data signal. That is, the above time unit is a time unit corresponding to an uplink control signal, the uplink control signal carrying HARQ-ACK information corresponding to the downlink data signal.

According to the above method of the embodiment of this disclosure, after receiving the downlink data signal at the time unit n, the terminal equipment applies corresponding actions not earlier than the time unit n+k+1, or, applies the actions related to the deactivation timer of the secondary cell at the time unit n+k+1, or, applies the actions related to the CSI report after the time unit n+k, with reference to the time unit corresponding to the transmission of the uplink control signal, the uplink control signal carrying the HARQ-ACK information corresponding to the downlink data signal, thereby avoiding indication errors or ambiguities of activation/deactivation by the downlink data signal.

In the embodiment of this disclosure, receiving the downlink data signal at the time unit n may be that the terminal equipment receives the downlink data signal ending at the time unit n. In the embodiment of this disclosure, the number of symbols included in the time unit may be less than 14, which may be referred to as a subslot, or may be in other names, and is not limited in this disclosure.

In the embodiment of this disclosure, the above downlink data signal is, for example, a PDSCH, or a signal carried by a PDSCH; and the above uplink control signal is, for example, a PUCCH, or a signal carried by a PUCCH; however, this disclosure is not limited thereto.

In some embodiments, the k is related to the number ($N_{slot}^{subslot}$) of time units included in a 14-symbol slot. For example, as shown in FIG. 1, a 14-symbol slot may be divided into two 7-symbol subslots, that is, a 14-symbol slot includes two subslots, then $N_{slot}^{subslot}=2$; and furthermore, as shown in FIG. 2, a 14-symbol slot may be divided into seven 2-symbol subslots, that is, a 14-symbol slot includes seven subslots, then $N_{slot}^{subslot}=7$; moreover, when a time unit corresponds to a 14-symbol slot, $N_{slot}^{subslot}=1$.

In some embodiments, the k is obtained through calculation by the following formula:

$$k = k_1 + 3N_{slot}^{subframe,\mu} N_{slot}^{subslot};$$

where, $N_{slot}^{subframe,\mu}$ refers to the number of slots contained in each subframe when the SCS configuration corresponding to the transmission of the uplink control signal is $\mu$, the slot referring to the above slot containing 14 symbols; $N_{slot}^{subslot}$ refers to the number of time units contained in a 14-symbol slot, as described above, which may be 1, 2 or 7, or other values; $k_1$ is related to the transmission of the uplink control signal carrying the HARQ-ACK information corresponding to the downlink data signal, and $k_1$ is indicated by a PDSCH-to-HARQ_feedback timing indicator field in scheduling DCI corresponding to the downlink data signal. Reference may be made to related technologies for the specific meanings of $N_{slot}^{subframe,\mu}$ and $k_1$, which shall not be described herein any further.

According to the above embodiment, taking the uplink control signal carrying the HARQ-ACK information as a reference, the effective time point of the corresponding action is specified, which avoids ambiguity of the action of the terminal equipment, and improves stability of the system.

In some embodiments, as shown in the examples of FIG. 1 and FIG. 2, the 14-symbol slot may be divided integrally, then $$N_{slot}^{subslot} = \frac{14}{L_{subslot}^{symbol}},$$

$L_{subslot}^{symbol}$ referring to the number of symbols corresponding to the time unit.

In some embodiments, the 14-symbol slot cannot be divided integrally, then $$N_{slot}^{subslot} = \left\lceil \frac{14}{L_{subslot}^{symbol}} \right\rceil,$$

$L_{subslot}^{symbol}$ referring to the number of longest symbols corresponding to the time unit. For example, a 14-symbol slot is divided into 4 subslots, wherein lengths of each subslot are: 3 symbols, 4 symbols, 3 symbols, and 4 symbols, respectively. At this moment, the number of longest symbols corresponding to the time unit is 4, then $N_{slot}^{subslot}=4$.

In some embodiments, the slot of 14 symbols cannot be divided integrally, then $$N_{slot}^{subslot} = \left\lfloor \frac{14}{L_{subslot}^{symbol}} \right\rfloor,$$

$L_{subslot}^{symbol}$ referring to the number of shortest symbols corresponding to the time unit. For example, a 14-symbol slot is divided into 4 subslots, wherein lengths of each subslot are: 3 symbols, 4 symbols, 3 symbols, and 4 symbols, respectively. At this moment, the number of shortest symbols corresponding to the time unit is 3, then $N_{slot}^{subslot}=4$.

In the embodiment of this disclosure, applying a corresponding action refers to applying an action related to or corresponding to the activation/deactivation command, for example, applying a corresponding SCell activation/deactivation action. In some embodiments, applying a corresponding action does not include applying an action related to CSI report. In some embodiments, applying a corresponding action does not include applying an action related to the SCell deactivation timer of the secondary cell. Reference may be made to related technologies for specific content of the action, which shall not be described herein any further.

In some embodiments, applying the action related to CSI report after the time unit n+k includes applying the action related to CSI report at a time unit after the time unit n+k, wherein, the time unit after the time unit n+k may be an earliest time unit in time units when (at which) CSI report is active after the time unit n+k.

In some embodiments, applying the action related to CSI report after the time unit n+k includes: applying the action related to CSI report at a time unit after the time unit n+k, the time unit after the time unit n+k being a time unit n+k+1; wherein the CSI report is active at the time unit n+k+1.

In some embodiments, applying the action related to CSI report after the time unit n+k includes: applying the action related to CSI report at a time unit after the time unit n+k, the time unit after the time unit n+k being an earliest time unit in time units when (at which) the CSI report is active after a time unit n+k+1. Here, the CSI report is not active at the time unit n+k+1.

The embodiment of this disclosure shall be described below with reference to the accompanying drawings.

Figure 4:
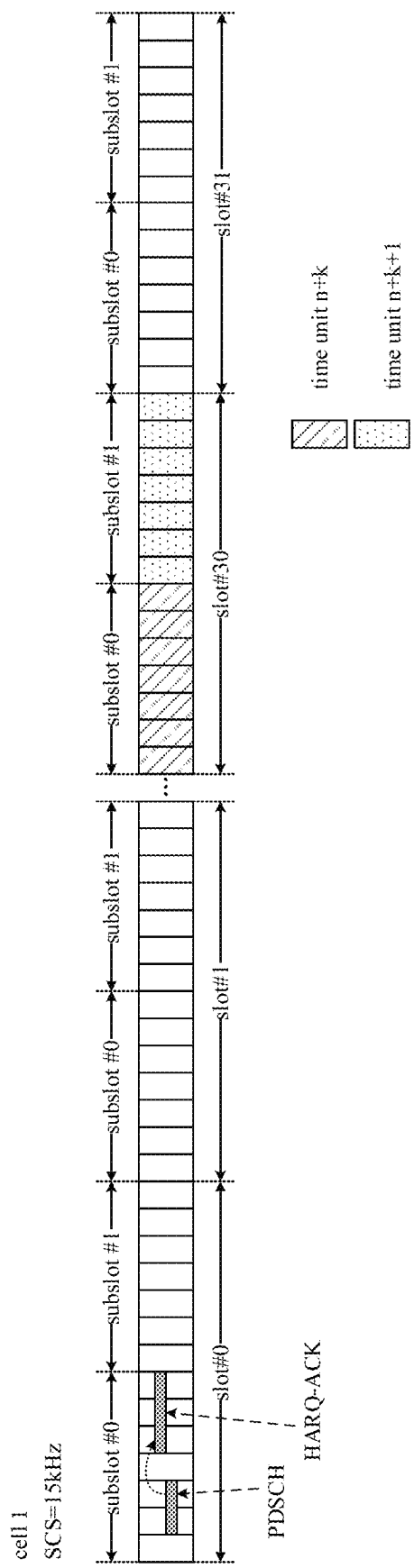
FIG. 4 is a schematic diagram of a slot of cell 1.

FIG. 4 is a schematic diagram of a slot of cell 1, wherein a subcarrier spacing (SCS) of cell 1 is 15 kHz. As shown in FIG. 4, according to subslot-based configuration information (subslotLengthForPUCCH), one slot is divided into two subslots (each subslot including 7 symbols). In cell 1, a UE receives a PDSCH containing an SCell activation command in subslot #0 of slot #0. According to the indication information, the UE feeds back HARQ-ACK information corresponding to the PDSCH in subslot #0 of slot #0 (transmitting an PUCCH carrying the HARQ-ACK information). It can be seen after substituting relevant information into the above formula that the UE applies the action related to SCell activation/deactivation not earlier than subslot #1 of slot #30. Here, the action related to the SCell activation does not include the action related to the CSI report, nor includes the action related to the SCell deactivation timer.

Figure 5:
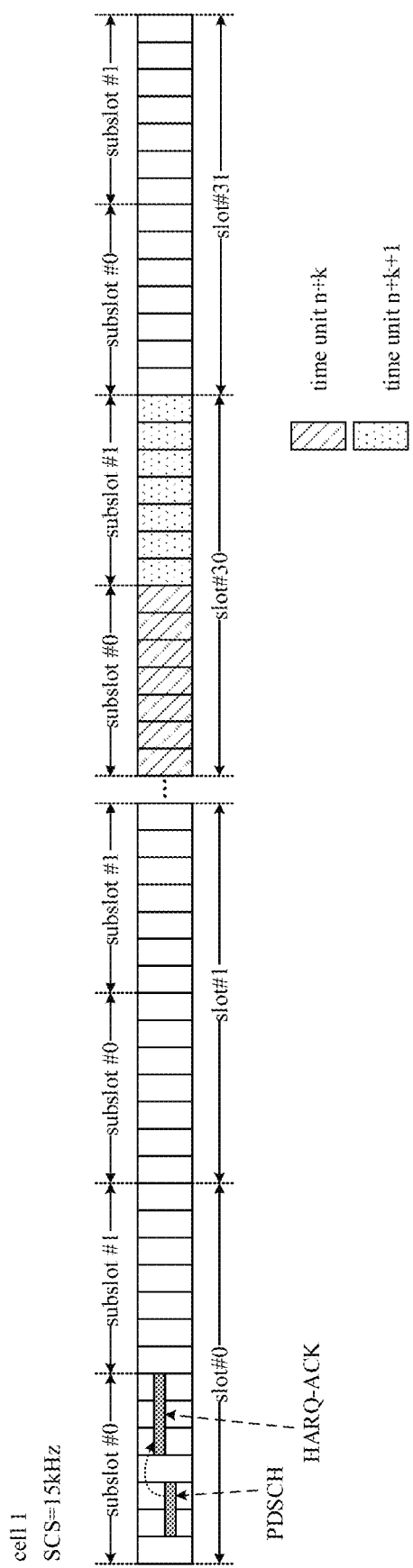
FIG. 5 is another schematic diagram of the slot of cell 1.

FIG. 5 is another schematic diagram of the slot of cell 1, wherein a subcarrier spacing (SCS) of cell 1 is 15 kHz. As shown in FIG. 5, according to subslot-based configuration information (subslotLengthForPUCCH), one slot may be divided into two subslots (each subslot including 7 symbols). In cell 1, the UE receives a PDSCH containing an SCell activation command in slot #0. According to the indication information, the UE feeds back HARQ-ACK information corresponding to the PDSCH in subslot #0 of slot #0 (transmitting a PUCCH carrying the HARQ-ACK information). It can be seen after substituting relevant information into the above formula that the UE applies the action related to the SCell deactivation timer in subslot #1 of slot #30.

Figure 6:
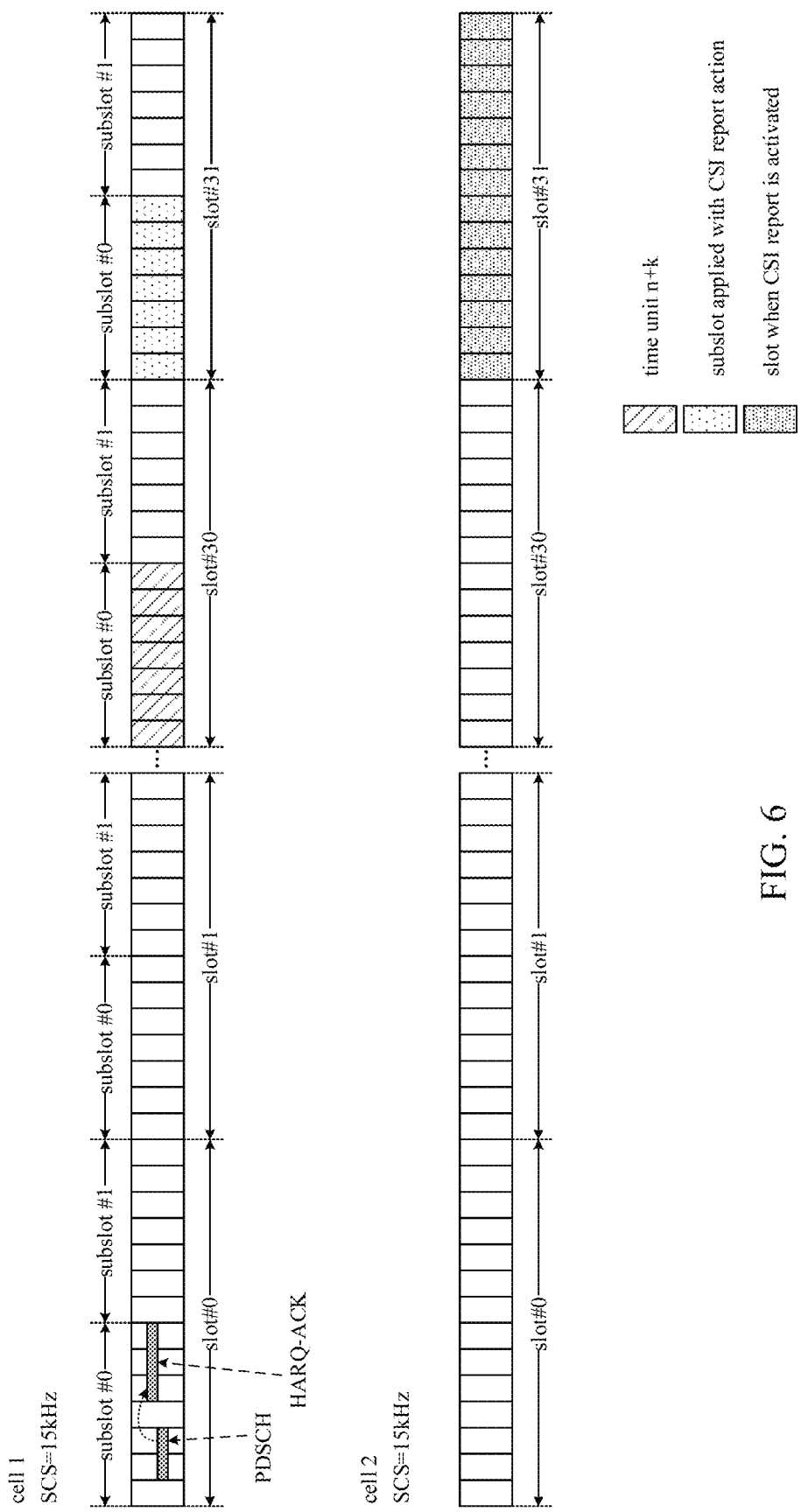
FIG. 6 is a schematic diagram of slots of cell 1 and cell 2.

FIG. 6 is a schematic diagram of slots of cell 1 and cell 2, wherein subcarrier spacings (SCSs) of cell 1 and cell 2 are both 15 kHz. In cell 1, according to subslot-based configuration information (subslotLengthForPUCCH), one slot may be divided into two subslots (each subslot including 7 symbols). For cell 2, CSI report is slot-based. In cell 1, the UE receives a PDSCH containing an SCell activation command in subslot #0 of slot #0, the activation command being used to activate cell 2. According to the indication information, the UE feeds back HARQ-ACK information corresponding to the PDSCH in subslot #0 of slot #0 (transmitting a PUCCH carrying the HARQ-ACK information). It can be seen after substituting relevant information into the above formula that the UE applies the action related to the CSI report after subslot #0 of slot #30. In addition, if the CSI report is activated in slot #31 (of cell 2), the UE applies the action related to the CSI report in subslot #0 of slot #31 (with reference to cell 1).

Figure 7:
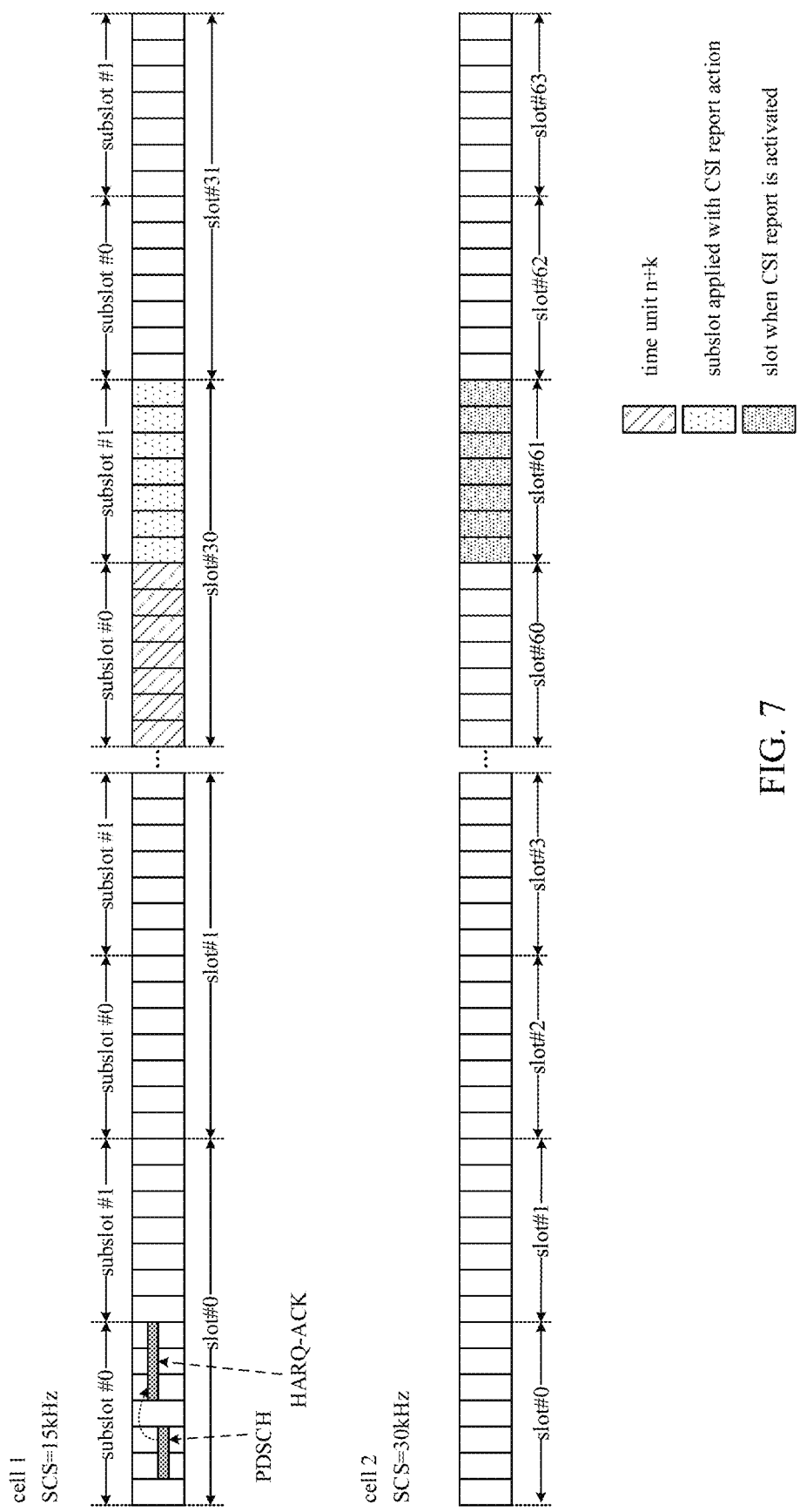
FIG. 7 is another schematic diagram of the slots of cell 1 and cell 2.

FIG. 7 is another schematic diagram of the slots of cell 1 and cell 2, wherein a subcarrier spacing (SCS) of cell 1 is 15 kHz and a subcarrier spacing (SCS) of cell 2 is 30 kHz. In cell 1, according to subslot-based configuration information (subslotLengthForPUCCH), one slot may be divided into two subslots (each subslot including 7 symbols). For cell 2, CSI report is slot-based. In cell 1, the UE receives a PDSCH containing an SCell activation command in subslot #0 of slot #0, the activation command being used to activate cell 2. According to the indication information, the UE feeds back HARQ-ACK information corresponding to the PDSCH in subslot #0 of slot #0 (transmitting a PUCCH carrying the HARQ-ACK information). It can be seen after substituting relevant information into the above formula that the UE applies the action related to the CSI report after subslot #0 of slot #30. In addition, if the CSI report is activated in slot #61 (of cell 2), the UE applies the action related to the CSI report in subslot #1 of slot #30 (with reference to cell 1).

Figure 8:
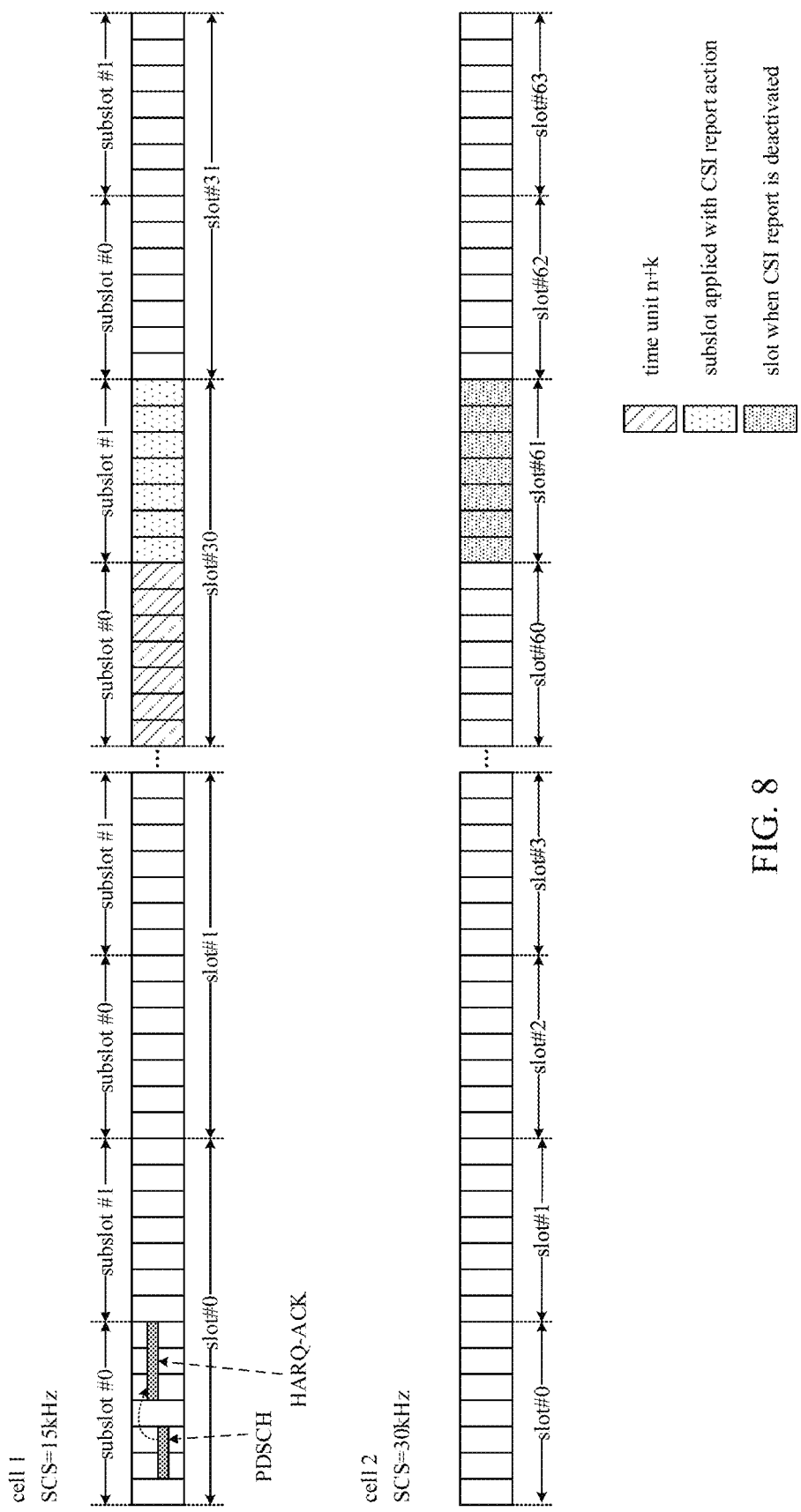
FIG. 8 is a further schematic diagram of the slots of cell 1 and cell 2.

FIG. 8 is a further schematic diagram of the slots of cell 1 and cell 2, wherein a subcarrier spacing (SCS) of cell 1 is 15 kHz and a subcarrier spacing (SCS) of cell 2 is 30 kHz. In cell 1, according to subslot-based configuration information (subslotLengthForPUCCH), one slot may be divided into two subslots (each subslot including 7 symbols). For cell 2, CSI report is slot-based. In cell 1, the UE receives a PDSCH containing an SCell deactivation command in subslot #0 of slot #0, the deactivation command being used to deactivate cell 2. According to the indication information, the UE feeds back HARQ-ACK information corresponding to the PDSCH in subslot #0 of slot #0 (transmitting a PUCCH carrying the HARQ-ACK information). It can be seen after substituting relevant information into the above formula that the UE applies the action related to the CSI report after subslot #0 of slot #30. For example, the UE deactivates the action related to the CSI report in subslot #1 of slot #30 (with reference to cell 1) or slot #61 (with reference to cell 2).

According to the method of the embodiment of this disclosure, as described above, the stability of the system is improved.

Embodiment of a Second Aspect

The embodiment of the second aspect of this disclosure provides a wireless communication method, which shall be described from a network device side. This method is processing at a network device side corresponding to the method of the embodiment of the first aspect, with contents identical to those in the embodiment of the first aspect being not going to be described herein any further.

Figure 9:
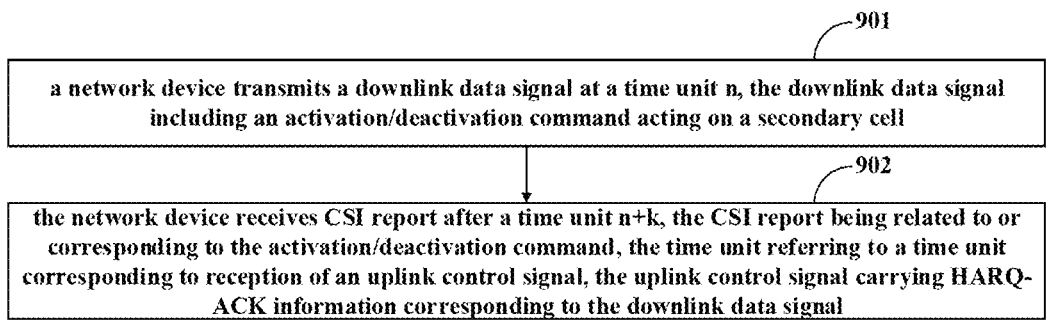
FIG. 9 is a schematic diagram of the wireless communication method of the embodiment of the second aspect of this disclosure.

FIG. 9 is a schematic diagram of the wireless communication method of the embodiment of this disclosure. As shown in FIG. 9, the method includes:

901: a network device transmits a downlink data signal at a time unit n, the downlink data signal including an activation/deactivation command acting on a secondary cell; and

902: the network device receives CSI report after a time unit n+k, the CSI report being related to or corresponding to the activation/deactivation command, the time unit referring to a time unit corresponding to reception of an uplink control signal, the uplink control signal carrying HARQ-ACK information corresponding to the downlink data signal.

In some embodiments, the k is related to the number ($N_{slot}^{subslot}$) of time units contained in a 14-symbol slot.

In some embodiments, the k is obtained through calculation by the following formula:

$$k = k_1 + 3N_{slot}^{subframe,\mu} N_{slot}^{subslot};$$

where, $N_{slot}^{subframe,\mu}$ refers to the number of slots contained in each subframe when SCS configuration corresponding to the reception of uplink control signal is p;

$N_{slot}^{subslot}$ refers to the number of the time units contained in a 14-symbol slot;

$k_1$ is related to the transmission of the uplink control signal carrying the HARQ-ACK information corresponding to the downlink data signal, and $k_1$ is indicated by a PDSCH-to-HARQ_feedback timing indicator field in scheduling DCI corresponding to the downlink data signal.

In some embodiments, the above $$N_{slot}^{subslot} = \frac{14}{L_{subslot}^{symbol}},$$

$L_{subslot}^{symbol}$ referring to the number of symbols corresponding to the time unit.

In some embodiments, the above $$N_{slot}^{subslot} = \left\lceil \frac{14}{L_{subslot}^{symbol}} \right\rceil,$$

$L_{subslot}^{symbol}$ referring to the number of longest symbols corresponding to the time unit.

In some embodiments, the above $$N_{slot}^{subslot} = \left\lfloor \frac{14}{L_{subslot}^{symbol}} \right\rfloor,$$

$L_{subslot}^{symbol}$ referring to the number of shortest symbols corresponding to the time unit.

In some embodiments, receiving the CSI report after the time unit n+k includes receiving the CSI report at a time unit after the time unit n+k, the time unit after the time unit n+k being an earliest time unit in time units when (at which) CSI report is active after the time unit n+k.

In some embodiments, receiving the CSI report after the time unit n+k includes: receiving the CSI report at a time unit after the time unit n+k, the time unit after the time unit n+k being a time unit n+k+1; wherein the CSI report is active at the time unit n+k+1.

In some embodiments, receiving the CSI report after the time unit n+k includes: receiving the CSI report at a time unit after the time unit n+k, the time unit after the time unit n+k being an earliest time unit in time units when (at which) the CSI report is active after a time unit n+k+1, wherein, the CSI report is not active at the time unit n+k+1.

In the embodiment of this disclosure, that the network device transmits the downlink data signal at the time unit n refers to that the network device transmits the downlink data signal ending at the time unit n.

In the embodiment of this disclosure, the time unit may be of a subslot, or the number of symbols included in the time unit is less than 14.

According to the method of the embodiment of this disclosure, the stability of the system is improved.

Embodiment of a Third Aspect

Figure 10:
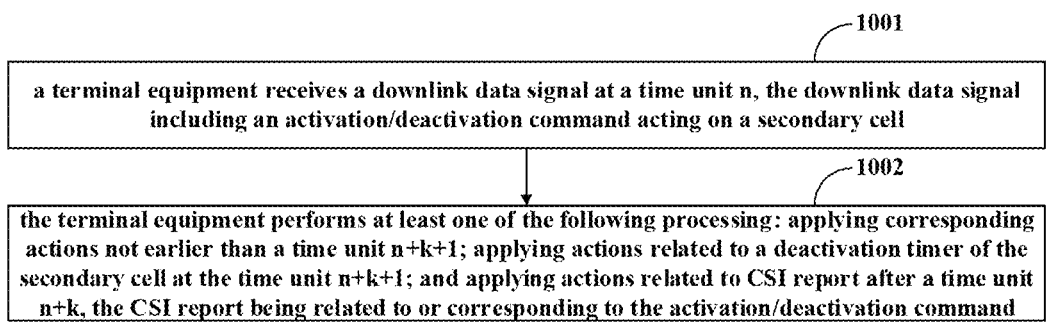
FIG. 10 is a schematic diagram of the wireless communication method of the embodiment of the third aspect of this disclosure.

Embodiment of the third aspect of this disclosure provides a wireless communication method, which shall be described from a terminal equipment side. FIG. 10 is a schematic diagram of the wireless communication method of the embodiment of this disclosure. As shown in FIG. 10, the method includes:

1001: a terminal equipment receives a downlink data signal at a time unit n, the downlink data signal including an activation/deactivation command acting on a secondary cell; and 1002: the terminal equipment performs at least one of the following processing: applying corresponding actions not earlier than a time unit n+k+1; applying actions related to a deactivation timer of the secondary cell at the time unit n+k+1; and applying actions related to CSI report after a time unit n+k, the CSI report being related to or corresponding to the activation/deactivation command.

In the embodiment of this disclosure, the time unit refers to a time unit corresponding to transmission of an uplink control signal, that is, the above time unit makes reference to a time unit corresponding to the uplink control signal.

According to the above method of the embodiment of this disclosure, after receiving the downlink data signal at the time unit n, the terminal equipment applies the corresponding action not earlier than the time unit n+k+1, or, applies the action related to the deactivation timer of the secondary cell at the time unit n+k+1, or, applies the action related to the CSI report after the time unit n+k, with reference to the time unit corresponding to the transmission of the uplink control signal, thereby avoiding indication errors or ambiguities of activation/deactivation by the downlink data signal.

In the embodiment of this disclosure, receiving the downlink data signal at the time unit n may be that the terminal equipment receives the downlink data signal ending at the time unit n. In the embodiment of this disclosure, the number of symbols included in the time unit may be less than 14, which may be referred to as a subslot, or may be in other names, and is not limited in this disclosure.

In the embodiment of this disclosure, the above downlink data signal is, for example, a PDSCH, or a signal carried by a PDSCH; and the above uplink control signal is, for example, a PUCCH, or a signal carried by a PUCCH; however, this disclosure is not limited thereto.

In some embodiments, the k is related to a slot offset or offset between the downlink data signal and the uplink control signal carrying the HARQ-ACK information corresponding to the downlink data signal.

In some embodiments, the k is obtained through calculation by the following formula:

$$k = k'_1 + 3N_{slot}^{subframe,\mu};$$

where, $N_{slot}^{subframe,\mu}$ refers to the number of slots included in each subframe when the SCS configuration corresponding to the transmission of the uplink control signal is µ. The slot here refers to the above slot including 14 symbols, and $k'_1$ refers to a slot offset or offset between the downlink data signal and the uplink control signal carrying the HARQ-ACK information corresponding to the downlink data signal, that is, when a terminal equipment receives a downlink data signal at a slot n, it transmits an uplink control signal carrying corresponding HARQ-ACK feedback information at a slot n+$k'_1$. Reference may be made to related technologies for a specific meaning of $N_{slot}^{subframe,\mu}$, which shall not be described herein any further.

According to the above embodiment, taking the PUCCH as a reference, the slot offset between the PDSCH carrying the Scell activation/deactivation command and the PUCCH carrying the HARQ-ACK information corresponding to the PDSCH is specified, so that the UE is able to accurately position an effective time point of a corresponding action, thereby avoiding ambiguity of the action of the UE, and improving the stability of the system.

In the embodiment of this disclosure, applying a corresponding action refers to applying an action related to or corresponding to the activation/deactivation command, for example, applying a corresponding SCell activation/deactivation action. In some embodiments, applying a corresponding action does not include applying an action related to CSI report. In some embodiments, applying a corresponding action does not include applying an action related to the SCell deactivation timer of the secondary cell. Reference may be made to related technologies for specific content of this action, which shall not be described herein any further.

In some embodiments, applying the action related to CSI report after the time unit n+k includes applying the action related to CSI report at a time unit after the time unit n+k, the time unit after the time unit n+k being an earliest time unit in time units when (at which) CSI report is active after the time unit n+k.

In some embodiments, applying the action related to CSI report after the time unit n+k includes: applying the action related to CSI report at a time unit after the time unit n+k, the time unit after the time unit n+k being a time unit n+k+1; wherein the CSI report is active at the time unit n+k+1.

In some embodiments, applying the action related to CSI report after the time unit n+k includes: applying the action related to CSI report at a time unit after the time unit n+k, the time unit after the time unit n+k being an earliest time unit in time units when (at which) the CSI report is active after a time unit n+k+1. Here, the CSI report is not active at the time unit n+k+1.

The embodiment of this disclosure shall be described below with reference to the accompanying drawings.

FIG. 11 is a schematic diagram of a slot of cell 1, wherein a subcarrier spacing (SCS) of cell 1 is 15 kHz. As shown in FIG. 11, according to subslot-based configuration information (subslotLengthForPUCCH), one slot may be divided into two subslots (each subslot including 7 symbols). In cell 1, a UE receives a PDSCH containing an SCell activation command in slot #0.

According to the indication information, the UE feeds back HARQ-ACK information corresponding to the PDSCH in slot #0 (transmitting a PUCCH carrying the HARQ-ACK information). It can be seen after substituting relevant information into the above formula that the UE applies the action related to SCell activation/deactivation not earlier than slot #31. Here, the action related to the SCell activation does not include the action related to the CSI report, nor includes the action related to the SCell deactivation timer.

In the example of FIG. 11, $k'_1$ refers to a slot offset between the PDSCH and the corresponding PUCCH carrying the HARQ-ACK information, and as the PDSCH and the corresponding PUCCH carrying the HARQ-ACK information are in the same slot, $k'_1=0$.

FIG. 12 is another schematic diagram of the slot of cell 1, wherein a subcarrier spacing (SCS) of cell 1 is 15 kHz. As shown in FIG. 12, according to subslot-based configuration information (subslotLengthForPUCCH), one slot may be divided into two subslots (each subslot including 7 symbols). In cell 1, the UE receives a PDSCH containing an SCell activation command in slot #0. According to the indication information, the UE feeds back the HARQ-ACK information corresponding to the PDSCH in slot #0 (transmitting a PUCCH carrying the HARQ-ACK information). It can be seen after substituting relevant information into the above formula that the UE applies the action related to the SCell deactivation timer in slot #31.

In the example of FIG. 12, $k'_1$ refers to a slot offset between the PDSCH and the corresponding PUCCH carrying the HARQ-ACK information, and as the PDSCH and the corresponding PUCCH carrying the HARQ-ACK information are in the same slot, $k'_1=0$.

Figure 13:
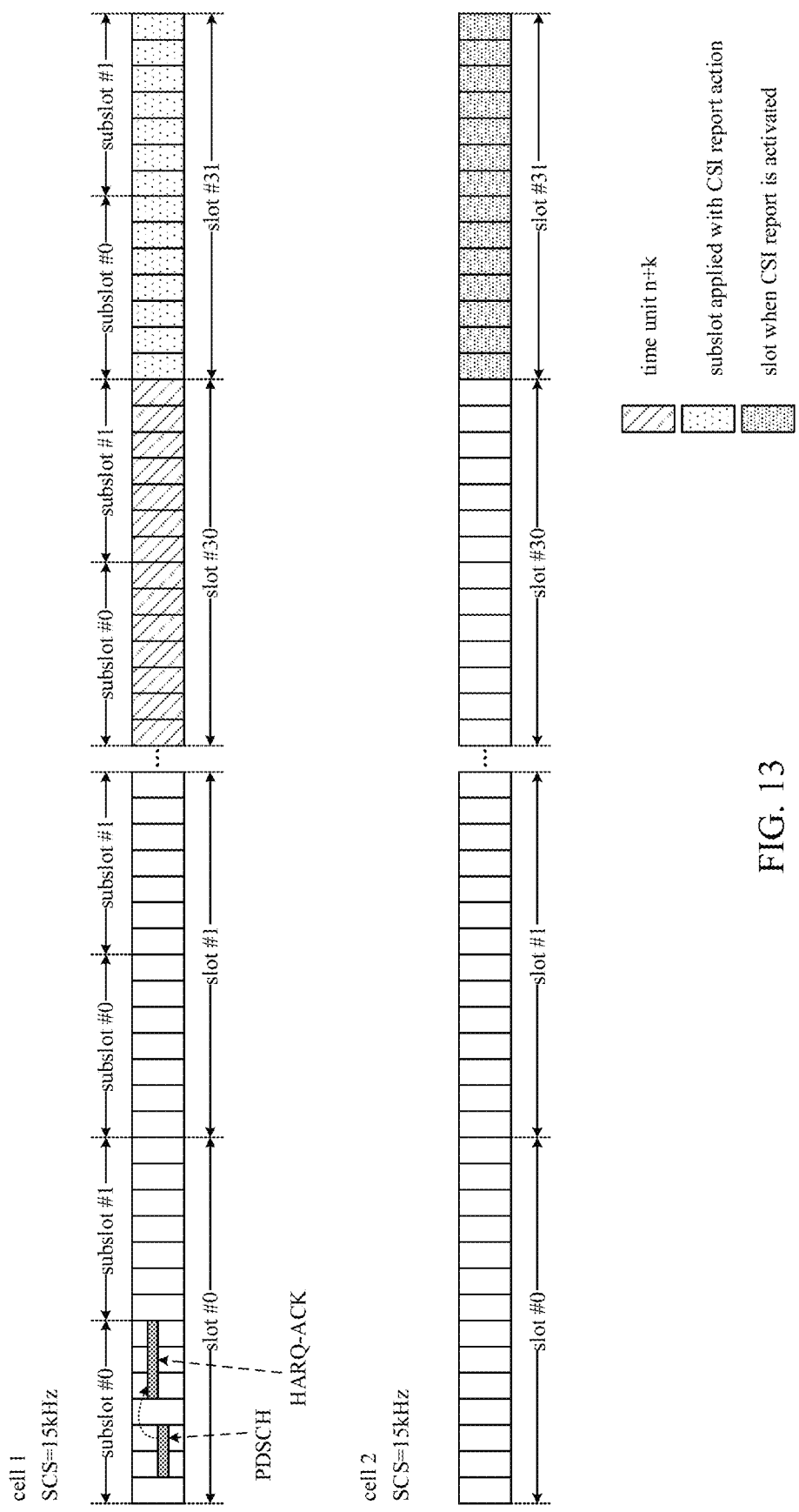
FIG. 13 is a schematic diagram of slots of cell 1 and cell 2.

FIG. 13 is a schematic diagram of slots of cell 1 and cell 2, wherein subcarrier spacings (SCSs) of cell 1 and cell 2 are both 15 kHz. As shown in FIG. 13, in cell 1, according to subslot-based configuration information (subslotLengthForPUCCH), one slot may be divided into two subslots (each subslot including 7 symbols). For cell 2, CSI report is slot-based. In cell 1, the UE receives a PDSCH containing an SCell activation command in slot #0, the activation command being used to activate cell 2. According to the indication information, the UE feeds back HARQ-ACK information corresponding to the PDSCH in slot #0 (transmitting a PUCCH carrying the HARQ-ACK information). It can be seen after substituting relevant information into the above formula that the UE applies the action related to the CSI report after slot #30. In addition, if the CSI report is activated in slot #31 (of cell 2), the UE applies the action related to the CSI report in slot #31 (with reference to cell 1).

In the example of FIG. 13, $k'_1$ refers to a slot offset between the PDSCH and the corresponding PUCCH carrying the HARQ-ACK information, and as the PDSCH and the corresponding PUCCH carrying the HARQ-ACK information are in the same slot, $k'_1=0$.

Figure 14:
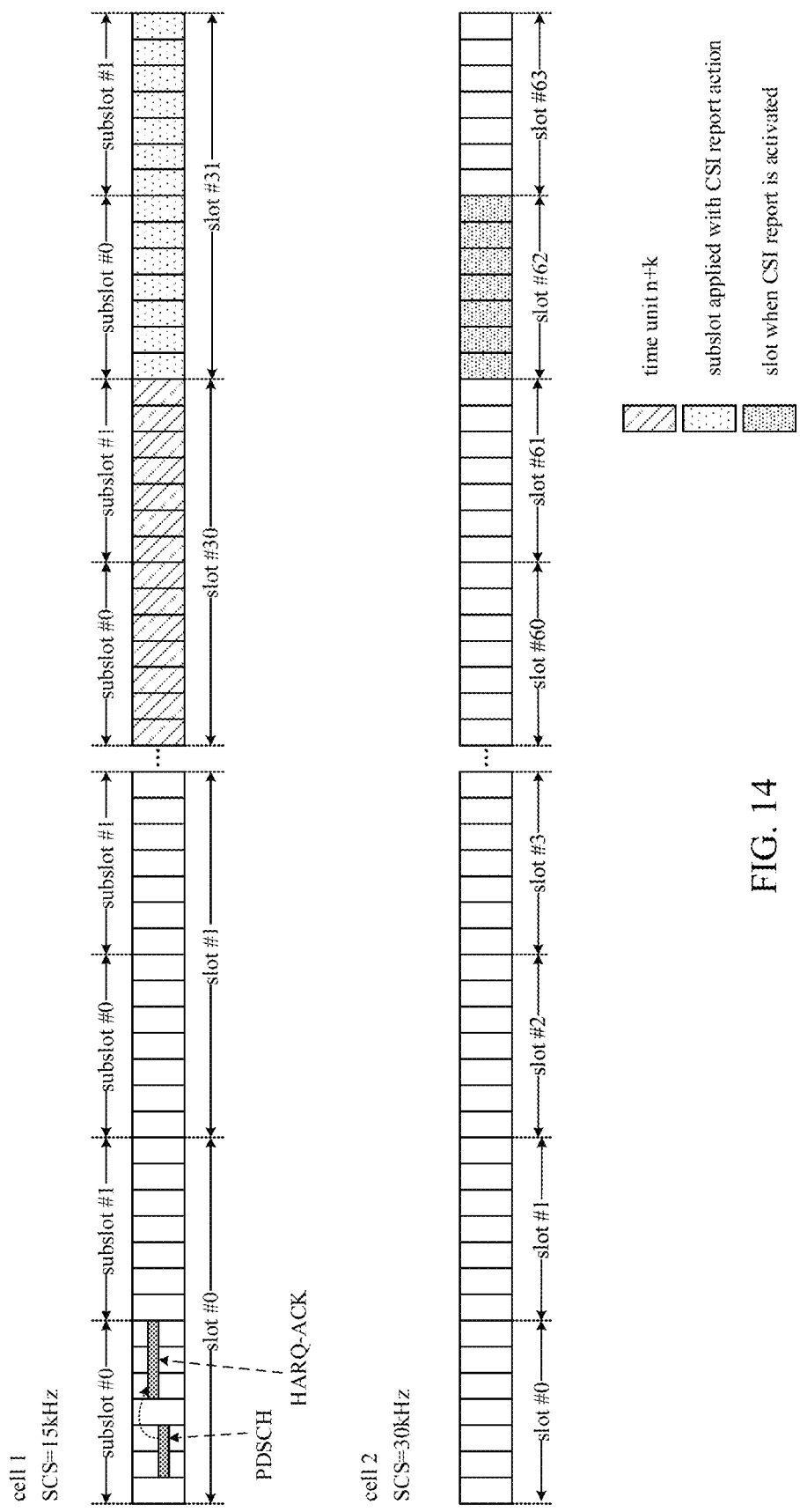
FIG. 14 is another schematic diagram of the slots of cell 1 and cell 2.

FIG. 14 is another schematic diagram of the slots of cell 1 and cell 2, wherein a subcarrier spacing (SCS) of cell 1 is 15 kHz and a subcarrier spacing (SCS) of cell 2 is 30 kHz. As shown in FIG. 14, in cell 1, according to subslot-based configuration information (subslotLengthForPUCCH), one slot may be divided into two subslots (each subslot including 7 symbols). For cell 2, CSI report is slot-based. In cell 1, the UE receives a PDSCH containing an SCell activation command in slot #0, the activation command being used to activate cell 2. According to the indication information, the UE feeds back HARQ-ACK information corresponding to the PDSCH in slot #0 (transmitting a PUCCH carrying the HARQ-ACK information). It can be seen after substituting relevant information into the above formula that the UE applies the action related to the CSI report after slot #30. In addition, if the CSI report is activated in slot #62 (of cell 2), the UE applies the action related to the CSI report in slot #31 (with reference to cell 1).

In the example of FIG. 14, $k'_1$ refers to a slot offset between the PDSCH and the corresponding PUCCH carrying the HARQ-ACK information, and although the PDSCH and the corresponding PUCCH carrying the HARQ-ACK information are in different subslots, they are in the same slot, and $k'_1=0$.

Figure 15:
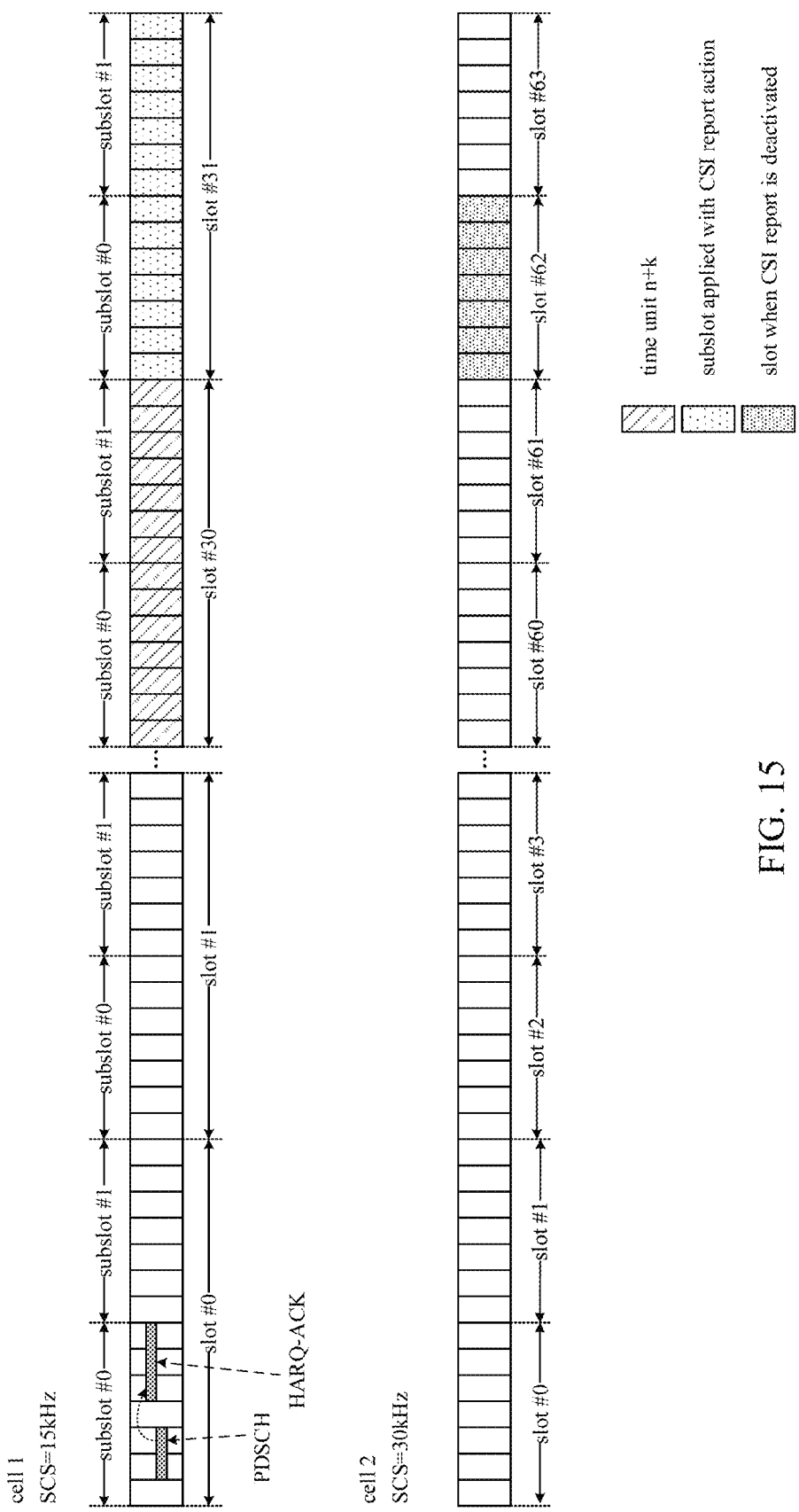
FIG. 15 is a further schematic diagram of the slots of cell 1 and cell 2.

FIG. 15 is a further schematic diagram of the slots of cell 1 and cell 2, wherein a subcarrier spacing (SCS) of cell 1 is 15 kHz and a subcarrier spacing (SCS) of cell 2 is 30 kHz. In cell 1, according to subslot-based configuration information (subslotLengthForPUCCH), one slot may be divided into two subslots (each subslot including 7 symbols). For cell 2, CSI report is slot-based. In cell 1, the UE receives a PDSCH containing an SCell deactivation command in slot #0, the deactivation command being used to deactivate cell 2. According to the indication information, the UE feeds back HARQ-ACK information corresponding to the PDSCH in slot #0 (transmitting a PUCCH carrying the HARQ-ACK information). It can be seen after substituting relevant information into the above formula that the UE applies the action related to the CSI report after slot #30. For example, the UE deactivates the action related to the CSI report in slot #31 (with reference to cell 1) or slot #62 (with reference to cell 2).

In the example of FIG. 15, $k'_1$ refers to a slot offset between the PDSCH and the corresponding PUCCH carrying the HARQ-ACK information, and although the PDSCH and the corresponding PUCCH carrying the HARQ-ACK information are in different subslots, they are in the same slot, and $k'_1=0$.

According to the method of the embodiment of this disclosure, as described above, the stability of the system is improved.

Embodiment of a Fourth Aspect

The embodiment of the fourth aspect of this disclosure provide a wireless communication method, which shall be described from a network device side. This method is processing at a network device side corresponding to the method of the embodiment of the third aspect, with contents identical to those in the embodiment of the third aspect being not going to be described herein any further.

Figure 16:
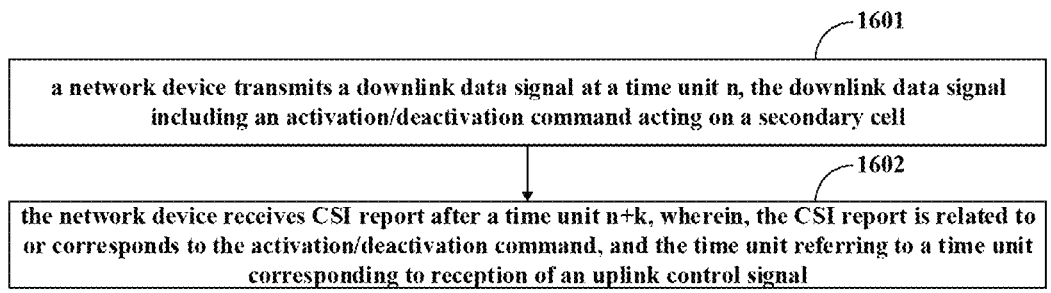
FIG. 16 is a schematic diagram of the wireless communication method of the embodiment of the fourth aspect of this disclosure.

FIG. 16 is a schematic diagram of the wireless communication method of the embodiment of this disclosure. As shown in FIG. 16, the method includes:

1601: a network device transmits a downlink data signal at a time unit n, the downlink data signal including an activation/deactivation command acting on a secondary cell; and

1602: the network device receives CSI report after a time unit n+k, wherein, the CSI report is related to or corresponds to the activation/deactivation command, and the time unit referring to a time unit corresponding to reception of an uplink control signal.

In some embodiments, the k is related to a slot offset or offset between the downlink data signal and the uplink control signal carrying the HARQ-ACK information corresponding to the downlink data signal.

In some embodiments, the k is obtained through calculation by the following formula:

$$k=k'_1+3N_{slot}^{subframe,\mu};$$

where, $N_{slot}^{subframe,\mu}$ refers to the number of slots included in each subframe when the SCS configuration corresponding to the reception of the uplink control signal is $\mu$, and $k'_1$ refers to a slot offset or offset between the downlink data signal and the uplink control signal carrying the HARQ-ACK information corresponding to the downlink data signal.

In some embodiments, receiving the CSI report after the time unit n+k includes: receiving the CSI report at a time unit after the time unit n+k, the time unit after the time unit n+k being an earliest time unit in time units when (at which) the CSI report is active after the time unit n+k.

In some embodiments, receiving the CSI report after the time unit n+k includes: receiving the CSI report at a time unit after the time unit n+k, the time unit after the time unit n+k being a time unit n+k+1; wherein, the CSI reporting is active at the time unit n+k+1.

In some embodiments, receiving the CSI report after the time unit n+k includes: receiving the CSI report at a time unit after the time unit n+k, the time unit after the time unit n+k being an earliest time unit in time units when (at which) the CSI report is active after a time unit n+k+1. Here, the CSI report is not active at the time unit n+k+1.

In the embodiment of this disclosure, that the terminal equipment transmits the downlink data signal at the time unit n refers to that the terminal equipment transmits the downlink data signal ending at the time unit n.

In the embodiment of this disclosure, the time unit is of a slot, or the time unit includes 14 symbols.

According to the method of the embodiment of this disclosure, the stability of the system is improved.

Embodiment of a Fifth Aspect

The embodiment of the fifth aspect of this disclosure provides a wireless communication device. The device may be, for example, a terminal equipment, or one or some components or assemblies configured in a terminal equipment.

Figure 17:
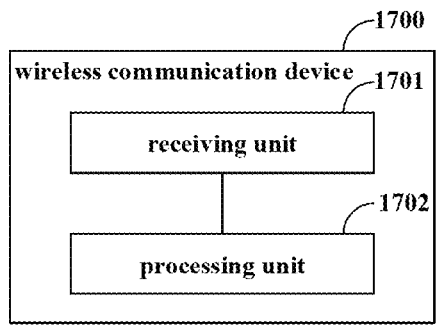
FIG. 17 is a schematic diagram of the wireless communication device of the embodiment of the fifth aspect of this disclosure.

FIG. 17 is a schematic diagram of the wireless communication device 1700 of the embodiment of this disclosure. As principles of the device for solving problems are similar to that of the method of the embodiment of the first aspect, reference may be made to the method of the embodiment of the first aspect for particular implementations of the device, with identical contents being not going to be described herein any further. As shown in FIG. 17, the device 1700 includes: a receiving unit 1701 and a processing unit 1702.

The receiving unit 1701 receives a downlink data signal at a time unit n, the downlink data signal including an activation/deactivation command acting on a secondary cell. The processing unit 1702 performs at least one of the following processing: applying corresponding actions not earlier than a time unit n+k+1; applying actions related to a deactivation timer of the secondary cell at the time unit n+k+1; and applying actions related to CSI report after a time unit n+k, the CSI report being related to or corresponding to the activation/deactivation command. The time unit refers to a time unit corresponding to transmission of an uplink control signal, the uplink control signal carrying HARQ-ACK information corresponding to the downlink data signal.

In some embodiments, the k is related to the number ($N_{slot}^{subslot}$) of time units included in a 14-symbol slot.

In some embodiments, the k is obtained through calculation by the following formula:

$$k = k_1 + 3N_{slot}^{subframe,\mu} N_{slot}^{subslot};$$

where, $N_{slot}^{subframe,\mu}$ refers to the number of slots contained in each subframe when the SCS configuration corresponding to the transmission of the uplink control signal is p;

$N_{slot}^{subslot}$ refers to the number of time units contained in a 14-symbol slot;

$k_1$ is related to the transmission of the uplink control signal carrying the HARQ-ACK information corresponding to the downlink data signal, and $k_1$ is indicated by a PDSCH-to-HARQ_feedback timing indicator field in scheduling DCI corresponding to the downlink data signal.

In some embodiments, $$N_{slot}^{subslot} = \frac{14}{L_{subslot}^{symbol}},$$

$L_{subslot}^{symbol}$ referring to the number of symbols corresponding to the time unit.

In some embodiments, the above $$N_{slot}^{subslot} = \left\lceil \frac{14}{L_{subslot}^{symbol}} \right\rceil,$$

$L_{subslot}^{symbol}$ referring to the number of longest symbols corresponding to the time unit.

In some embodiments, the above $$N_{slot}^{subslot} = \left\lfloor \frac{14}{L_{subslot}^{symbol}} \right\rfloor,$$

$L_{subslot}^{symbol}$ referring to the number of shortest symbols corresponding to the time unit.

In some embodiment of this disclosure, applying a corresponding action includes applying a corresponding SCell activation/deactivation action.

In some embodiments, applying a corresponding action does not include applying an action related to CSI report.

In some embodiments, applying a corresponding action does not include applying an action related to the SCell deactivation timer of the secondary cell.

In some embodiments, applying the action related to CSI report after the time unit n+k includes: applying the action related to CSI report at a time unit after the time unit n+k, the time unit after the time unit n+k being an earliest time unit in time units when (at which) the CSI report is active after the time unit n+k.

In some embodiments, applying the action related to CSI report after the time unit n+k includes: applying the action related to CSI report at a time unit after the time unit n+k, the time unit after the time unit n+k being a time unit n+k+1; wherein the CSI report is active at the time unit n+k+1.

In some embodiments, applying the action related to CSI report after the time unit n+k includes: applying the action related to CSI report at a time unit after the time unit n+k, the time unit after the time unit n+k being an earliest time unit in time units when (at which) the CSI report is active after a time unit n+k+1. Here, the CSI report is not active at the time unit n+k+1.

In some embodiments, that the terminal equipment receives the downlink data signal at the time unit n refers to that the terminal equipment receives the downlink data signal ending at the time unit n.

In some embodiments, the time unit is of a subslot, or the number of symbols included in the time unit is less than 14.

Figure 18:
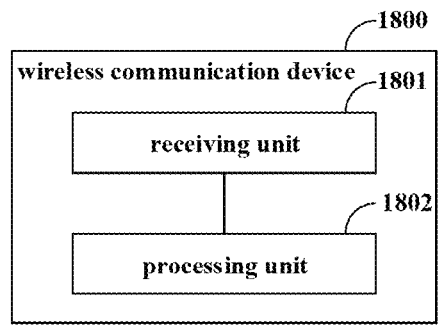
FIG. 18 is another schematic diagram of the wireless communication device of the embodiment of the fifth aspect of this disclosure.

FIG. 18 is another schematic diagram of the wireless communication apparatus 1800 of the embodiment of this disclosure. As principles of the device for solving problems are similar to that of the method of the embodiment of the third aspect, reference may be made to the method of the embodiment of the third aspect for particular implementations of the device, with identical contents being not going to be described herein any further. As shown in FIG. 18, the device 1800 includes: a receiving unit 1801 and a processing unit 1802.

The receiving unit 1801 receives a downlink data signal at a time unit n, the downlink data signal including an activation/deactivation command acting on a secondary cell. And the processing unit 1802 performs at least one of the following processing: applying corresponding actions not earlier than a time unit n+k+1; applying actions related to a deactivation timer of the secondary cell at the time unit n+k+1; and applying actions related to CSI report after a time unit n+k, the CSI report being related to or corresponding to the activation/deactivation command, and the time unit referring to a time unit corresponding to transmission of an uplink control signal.

In some embodiments, the k is related to a slot offset or offset between the downlink data signal and the uplink control signal carrying the HARQ-ACK information corresponding to the downlink data signal.

In some embodiments, the k is obtained through calculation by the following formula:

$$k = k'_1 + 3N_{slot}^{subframe,\mu};$$

where, $N_{slot}^{subframe,\mu}$ refers to the number of slots included in each subframe when the SCS configuration corresponding to the transmission of the uplink control signal is μ, and $k'_1$ refers to a slot offset or offset between the downlink data signal and the uplink control signal carrying the HARQ-ACK information corresponding to the downlink data signal.

In some embodiments, applying a corresponding action includes applying a corresponding SCell activation/deactivation action.

In some embodiments, applying a corresponding action does not include applying an action related to CSI report.

In some embodiments, applying a corresponding action does not include applying an action related to the SCell deactivation timer of the secondary cell.

In some embodiments, applying the action related to CSI report after the time unit n+k includes: applying the action related to CSI report at a time unit after the time unit n+k, the time unit after the time unit n+k being an earliest time unit in time units when (at which) the CSI report is active after the time unit n+k.

In some embodiments, applying the action related to CSI report after the time unit n+k includes: applying the action related to CSI report at a time unit after the time unit n+k, the time unit after the time unit n+k being a time unit n+k+1; wherein the CSI report is active at the time unit n+k+1.

In some embodiments, applying the action related to CSI report after the time unit n+k includes: applying the action related to CSI report at a time unit after the time unit n+k, the time unit after the time unit n+k being an earliest time unit in time units when (at which) the CSI report is active after a time unit n+k+1. Here, the CSI report is not active at the time unit n+k+1.

In some embodiments, that the terminal equipment receives the downlink data signal at the time unit n refers to that the terminal equipment receives the downlink data signal ending at the time unit n.

In some embodiments, the time unit is of a slot, or the time unit includes 14 symbols.

According to the embodiment of this disclosure, the stability of the system is improved.

Embodiment of a Sixth Aspect

The embodiment of the sixth aspect of this disclosure provides a wireless communication apparatus. The device may be, for example, a network device, or one or some components or assemblies configured in a network device.

Figure 19:
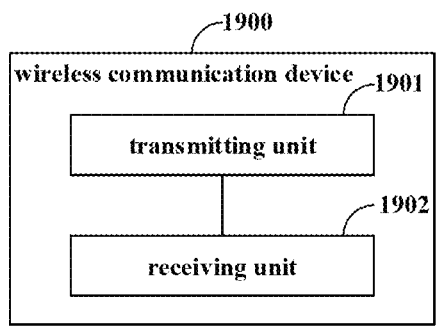
FIG. 19 is a schematic diagram of the wireless communication device of the embodiment of the sixth aspect of this disclosure.

FIG. 19 is a schematic diagram of the wireless communication device 1900 of the embodiment of this disclosure. As principles of the device for solving problems are similar to that of the method of the embodiment of the second aspect, reference may be made to the method of the embodiment of the second aspect for particular implementations of the device, with identical contents being not going to be described herein any further. As shown in FIG. 19, the device 1900 includes: a transmitting unit 1901 and a receiving unit 1902.

The transmitting unit 1901 transmits a downlink data signal (PDSCH) at a time unit n, the downlink data signal including an activation/deactivation command acting on a secondary cell.

And the receiving unit 1902 receives CSI report after a time unit n+k, the CSI report being related to or corresponding to the activation/deactivation command, and the time unit referring to a time unit corresponding to reception of an uplink control signal, the uplink control signal carrying HARQ-ACK information corresponding to the downlink data signal.

In some embodiments, the k is related to the number ($N_{slot}^{subslot}$) of time units contained in a 14-symbol slot.

In some embodiments, the k is obtained through calculation by the following formula:

$$k = k_1 + 3N_{slot}^{subframe,\mu}N_{slot}^{subslot};$$

where, $N_{slot}^{subframe,\mu}$ refers to the number of slots contained in each subframe when SCS configuration corresponding to reception of the uplink control signal is p;

$N_{slot}^{subslot}$ refers to the number of the time units contained in a 14-symbol slot;

$k_1$ is related to the transmission of the uplink control signal carrying the HARQ-ACK information corresponding to the downlink data signal, and $k_1$ is indicated by a PDSCH-to-HARQ_feedback timing indicator field in scheduling DCI corresponding to the downlink data signal.

In some embodiments, the above $$N_{slot}^{subslot} = \frac{14}{L_{subslot}^{symbol}},$$

$L_{subslot}^{symbol}$ referring to the number of symbols corresponding to the time unit.

In some embodiments, the above $$N_{slot}^{subslot} = \left\lceil \frac{14}{L_{subslot}^{symbol}} \right\rceil,$$

$L_{subslot}^{symbol}$ referring to the number of longest symbols corresponding to the time unit.

In some embodiments, the above $$N_{slot}^{subslot} = \left\lfloor \frac{14}{L_{subslot}^{symbol}} \right\rfloor,$$

$L_{subslot}^{symbol}$ referring to the number of shortest symbols corresponding to the time unit.

In some embodiments, receiving the CSI report after the time unit n+k includes receiving the CSI report at a time unit after the time unit n+k, the time unit after the time unit n+k being an earliest time unit in time units when (at which) CSI report is active after the time unit n+k.

In some embodiments, receiving the CSI report after the time unit n+k includes: receiving the CSI report at a time unit after the time unit n+k, the time unit after the time unit n+k being a time unit n+k+1; wherein the CSI report is active at the time unit n+k+1.

In some embodiments, receiving the CSI report after the time unit n+k includes: receiving the CSI report at a time unit after the time unit n+k, the time unit after the time unit n+k being an earliest time unit in time units when (at which) the CSI report is active after a time unit n+k+1, wherein, the CSI report is not active at the time unit n+k+1.

In some embodiments, that the network device transmits the downlink data signal at the time unit n refers to that the network device transmits the downlink data signal ending at the time unit n.

In some embodiments, the time unit is of a subslot, or the number of symbols included in the time unit is less than 14.

Figure 20:
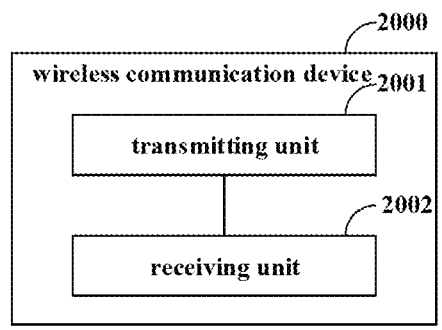
FIG. 20 is another schematic diagram of the wireless communication device of the embodiment of the sixth aspect of this disclosure.

FIG. 20 is a schematic diagram of the wireless communication device 2000 of the embodiment of this disclosure. As principles of the device for solving problems are similar to that of the method of the embodiment of the fourth aspect, reference may be made to the method of the embodiment of the fourth aspect for particular implementations of the device, with identical contents being not going to be described herein any further. As shown in FIG. 20, the device 2000 includes: a transmitting unit 2001 and a receiving unit 2002.

The transmitting unit 2001 transmits a downlink data signal at a time unit n, the downlink data signal including an activation/deactivation command acting on a secondary cell. And the receiving unit 2002 receives CSI report after a time unit n+k, wherein, the CSI report is related to or corresponds to the activation/deactivation command, and the time unit referring to a time unit corresponding to reception of an uplink control signal.

In some embodiments, the k is related to a slot offset or offset between the downlink data signal and the uplink control signal carrying the HARQ-ACK information corresponding to the downlink data signal.

In some embodiments, the k is obtained through calculation by the following formula:

$$k = k'_1 + 3 N_{slot}^{subframe,\mu};$$

where, $N_{slot}^{subframe,\mu}$ refers to the number of slots included in each subframe when the SCS configuration corresponding to the reception of the uplink control signal is $\mu$, and $k'_1$ refers to a slot offset or offset between the downlink data signal and the uplink control signal carrying the HARQ-ACK information corresponding to the downlink data signal.

In some embodiments, receiving the CSI report after the time unit n+k includes: receiving the CSI report at a time unit after the time unit n+k, the time unit after the time unit n+k being an earliest time unit in time units when (at which) the CSI report is active after a time unit n+k.

In some embodiments, receiving the CSI report after the time unit n+k includes: receiving the CSI report at a time unit after the time unit n+k, the time unit after the time unit n+k being a time unit n+k+1; wherein the CSI report is active at the time unit n+k+1.

In some embodiments, receiving the CSI report after the time unit n+k includes: receiving the CSI report at a time unit after the time unit n+k, the time unit after the time unit n+k being an earliest time unit in time units when (at which) the CSI report is active after a time unit n+k+1.

In some embodiments, the CSI report is not active at the time unit n+k+1.

In some embodiments, that the terminal equipment transmits the downlink data signal at the time unit n refers to that the terminal equipment transmits the downlink data signal ending at the time unit n.

In some embodiments, the time unit is of a slot, or the time unit includes 14 symbols.

According to the embodiment of this disclosure, the stability of the system is improved.

Embodiment of a Seventh Aspect

Figure 21:
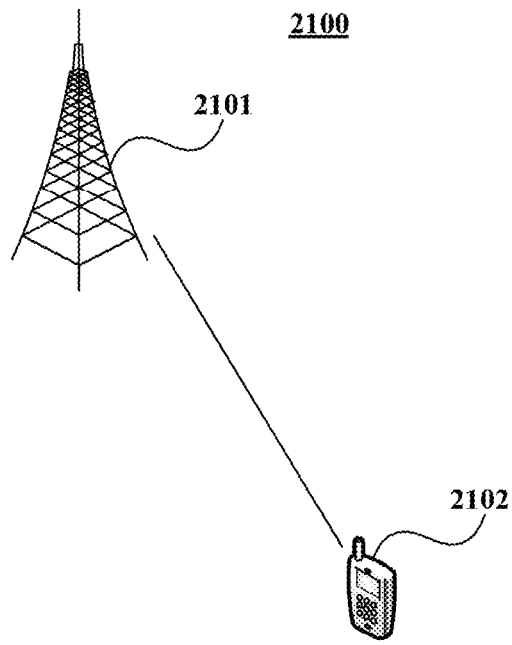
FIG. 21 is a schematic diagram of the communication system of the embodiment of the seventh aspect of this disclosure.

The embodiment of the seventh aspect of this disclosure provides a communication system. FIG. 21 is a schematic diagram of the communication system 2100. As shown in FIG. 21, the communication system 2100 includes a network device 2101 and a terminal equipment 2102. For the sake of simplicity, description is given in FIG. 21 by taking only one terminal equipment and one network device as examples; however, the embodiment of this disclosure is not limited thereto.

In the embodiment of this disclosure, existing services or services that may be implemented in the future may be performed between the network device 2101 and the terminal equipment 2102. For example, such services may include but not limited to an enhanced mobile broadband (eMBB), massive machine type communication (mMTC), ultra-reliable and low-latency communication (URLLC), and vehicle to everything (V2X), etc.

In some embodiments, the network device 2101 transmits a downlink data signal (PDSCH) at a time unit n, the downlink data signal including an activation/deactivation command acting on a secondary cell. The terminal equipment 2102 receives the downlink data signal (PDSCH) at the time unit n, and performs at least one of the following processes: applying corresponding actions not earlier than a time unit n+k+1; applying actions related to a deactivation timer of the secondary cell at the time unit n+k+1; and applying actions related to CSI report after a time unit n+k, wherein, the CSI report is related to or corresponds to the activation/deactivation command. The network device 2101 receives the CSI report after a time unit n+k.

In an embodiment, the time unit refers to a time unit corresponding to transmission of an uplink control signal, the uplink control signal carrying HARQ-ACK information corresponding to the downlink data signal. For specific implementations, reference may be made to the embodiments of the first and the second aspects.

In another embodiment, the above time unit refers to a time unit corresponding to transmission of the uplink control signal. For specific implementations, reference may be made to the embodiments of the third and the fourth aspects.

The embodiment of this disclosure further provides a terminal equipment, such as a UE; however, this disclosure is not limited thereto, and it may also be another equipment.

Figure 22:
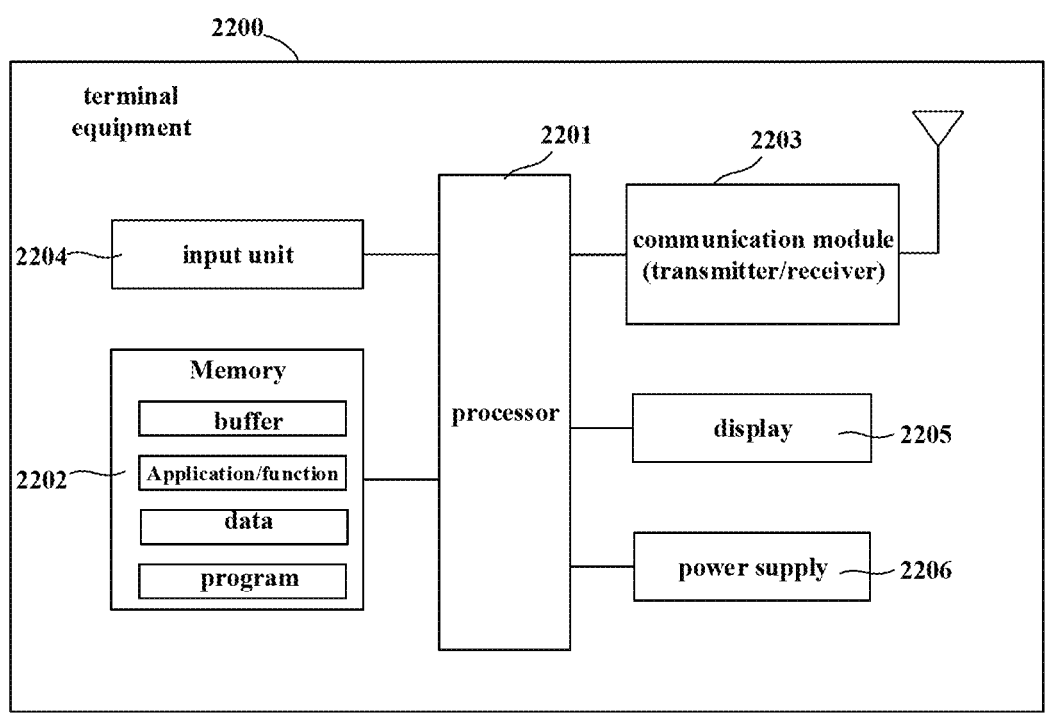
FIG. 22 is a schematic diagram of the terminal equipment of the embodiment of the seventh aspect of this disclosure.

FIG. 22 is a schematic diagram of the terminal equipment of the embodiment of this disclosure. As shown in FIG. 22, the terminal equipment 2200 may include a processor 2201 and a memory 2202, the memory 2202 storing data and a program and being coupled to the processor 2201. It should be noted that this figure is illustrative only, and other types of structures may also be used, so as to supplement or replace this structure and achieve a telecommunications function or other functions.

For example, the processor 2201 may be configured to execute a program to carry out the wireless communication method as described in the embodiment of the first aspect or the third aspect.

As shown in FIG. 22, the terminal equipment 2200 may further include a communication module 2203, an input unit 2204, a display 2205, and a power supply 2206; wherein functions of the above components are similar to those in the prior art, which shall not be described herein any further. It should be noted that the terminal equipment 2200 does not necessarily include all the parts shown in FIG. 22, and the above components are not necessary. Furthermore, the terminal equipment 2200 may include parts not shown in FIG. 22, and the prior art may be referred to.

The embodiment of this disclosure further provides a network device, which may be, for example, a base station (gNB). However, this disclosure is not limited thereto, and it may also be another network device.

Figure 23:
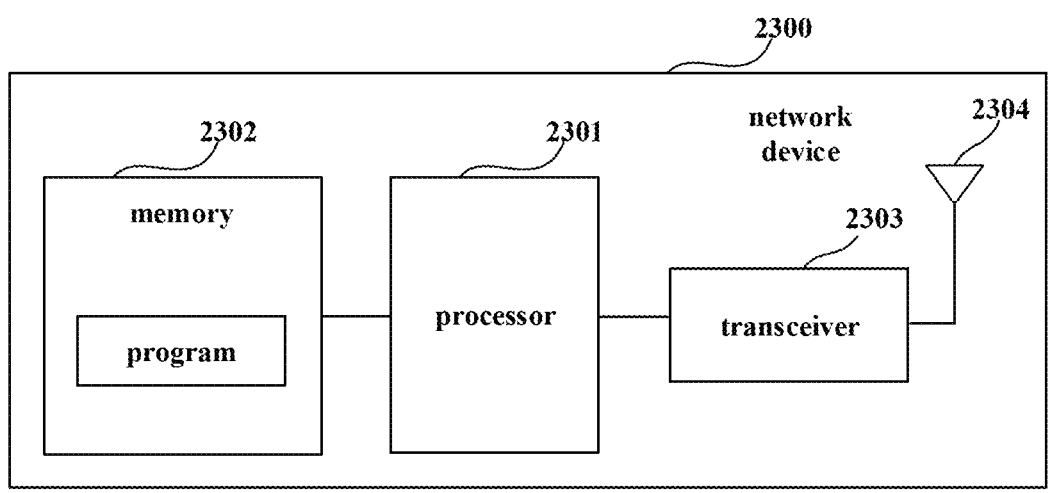
FIG. 23 is a schematic diagram of the network device of the embodiment of the seventh aspect of this disclosure.

FIG. 23 is a schematic diagram of the network device of the embodiment of this disclosure. As shown in FIG. 23, the network device 2300 may include a processor 2301 (such as a central processing unit (CPU)) and a memory 2302, the memory 2302 being coupled to the processor 2301. The memory 2302 may store various data, and furthermore, it may store a program for data processing, and execute the program under control of the processor 2301.

For example, the processor 2301 may be configured to execute the program to carry out the wireless communication method as described in the embodiment of the second or the fourth aspect.

Furthermore, as shown in FIG. 23, the network device 2300 may also include a transceiver 2303, and an antenna 2304, etc. Functions of the above components are similar to those in the prior art, and shall not be described herein any further. It should be noted that the network device 2300 does not necessarily include all the parts shown in FIG. 23, and furthermore, the network device 2300 may include parts not shown in FIG. 23, and the prior art may be referred to.

An embodiment of this disclosure provides a computer readable program, which, when executed in a terminal equipment, will cause the terminal equipment to carry out the wireless communication method as described in the embodiment of the first or the third aspect.

An embodiment of this disclosure provides a storage medium storing a computer readable program, which, when executed in a terminal equipment, will cause the terminal equipment to carry out the wireless communication method as described in the embodiment of the first or the third aspect.

An embodiment of this disclosure provides a computer readable program, which, when executed in a network device, will cause the network device to carry out the wireless communication method as described in the embodiment of the second or the fourth aspect.

An embodiment of this disclosure provides a storage medium storing a computer readable program, which, when executed in a network device, will cause the network device to carry out the wireless communication method as described in the embodiment of the second or the fourth aspect.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

As to the above implementations disclosed in the embodiments, following supplements are further disclosed.

Supplement 1. A wireless communication method, including:

receiving a downlink data signal by a terminal equipment at a time unit n, the downlink data signal including an activation/deactivation command acting on a secondary cell; and performing at least one of the following processing by the terminal equipment:

applying corresponding actions not earlier than a time unit $n+k+1$;

applying actions related to a deactivation timer of the secondary cell at the time unit n+k+1; and applying actions related to CSI report after a time unit n+k, the CSI report being related to or corresponding to the activation/deactivation command, the time unit referring to a time unit corresponding to transmission of an uplink control signal, the uplink control signal carrying HARQ-ACK information corresponding to the downlink data signal.

Supplement 2. The method according to supplement 1, wherein, the k is related to the number ($N_{slot}^{subslot}$) of time units included in a 14-symbol slot.

Supplement 3. The method according to supplement 1, wherein the k is obtained through calculation by the following formula:

$$k=k_1+3N_{slot}^{subframe,\mu}N_{slot}^{subslot};$$

where, $N_{slot}^{subframe,\mu}$ refers to the number of slots contained in each subframe when the SCS slot configuration corresponding to the transmission of the uplink control signal is p;

$N_{slot}^{subslot}$ refers to the number of time units contained in a 14-symbol slot;

$k_1$ is related to the transmission of the uplink control signal carrying the HARQ-ACK information corresponding to the downlink data signal, and $k_1$ is indicated by a PDSCH-to-HARQ_feedback timing indicator field in scheduling DCI corresponding to the downlink data signal.

Supplement 4. The method according to supplement 3, wherein $N_{slot}^{subslot}$ is one of the following:

$$N_{slot}^{subslot} = \frac{14}{L_{subslot}^{symbol}},$$

$L_{subplot}^{symbol}$ referring to the number of symbols corresponding to the time unit;

$$N_{slot}^{subslot} = \left\lceil \frac{14}{L_{subslot}^{symbol}} \right\rceil,$$

$L_{subslot}^{symbol}$ referring to the number of longest symbols corresponding to the time unit; and $$N_{slot}^{subslot} = \left\lfloor \frac{14}{L_{subslot}^{symbol}} \right\rfloor,$$

$L_{subslot}^{symbol}$ referring to the number of shortest symbols corresponding to the time unit.

Supplement 5. The method according to supplement 1, wherein the applying corresponding actions includes applying a corresponding SCell activation/deactivation action.

Supplement 6. The method according to supplement 1, wherein the applying corresponding actions does not include applying an action related to CSI report.

Supplement 7. The method according to supplement 1, wherein the applying corresponding actions does not include applying an action related to the SCell deactivation timer of the secondary cell.

Supplement 8. The method according to supplement 1, wherein the applying actions related to CSI report after the time unit n+k includes: applying the actions related to CSI report at a time unit after the time unit n+k, the time unit after the time unit n+k being an earliest time unit in time units when (at which) CSI report is active after the time unit n+k.

Supplement 9. The method according to supplement 1, wherein the applying actions related to CSI report after the time unit n+k includes: applying the actions related to CSI report at a time unit after the time unit n+k, the time unit after the time unit n+k being a time unit n+k+1; wherein the CSI report is active at the time unit n+k+1.

Supplement 10. The method according to supplement 1, wherein the applying actions related to CSI report after the time unit n+k includes: applying the actions related to CSI report at a time unit after the time unit n+k, the time unit after the time unit n+k being an earliest time unit in time units when (at which) the CSI report is active after a time unit n+k+1.

Supplement 11. The method according to supplement 10, wherein, the CSI report is not active at the time unit n+k+1.

Supplement 12. The method according to supplement 1, wherein that the terminal equipment receives the downlink data signal at the time unit n refers to:

that the terminal equipment receives the downlink data signal ending at the time unit n.

Supplement 13. The method according to supplement 1, wherein the time unit is of a subslot, or, the number of symbols included in the time unit is less than 14.

Supplement 14. A wireless communication method, including:

transmitting a downlink data signal by a network device at a time unit n, the downlink data signal including an activation/deactivation command acting on a secondary cell; and receiving CSI report by the network device after a time unit n+k, wherein, the CSI report is related to or corresponds to the activation/deactivation command;

the time unit referring to a time unit corresponding to reception of an uplink control signal, the uplink control signal carrying HARQ-ACK information corresponding to the downlink data signal.

Supplement 15. The method according to supplement 14, wherein, the k is related to the number ($N_{slot}^{subslot}$) of time units contained in a 14-symbol slot.

Supplement 16. The method according to supplement 14, wherein the k is obtained through calculation by the following formula:

$$k=k_1+3N_{slot}^{subframe,\mu}N_{slot}^{subslot};$$

where, $N_{slot}^{subframe,\mu}$ refers to the number of slots contained in each subframe when SCS configuration corresponding to reception of the uplink control signal is p;

$N_{slot}^{subslot}$ refers to the number of the time units contained in a 14-symbol slot;

$k_1$ is related to the transmission of the uplink control signal carrying the HARQ-ACK information corresponding to the downlink data signal, and $k_1$ is indicated by a PDSCH-to-HARQ_feedback timing indicator field in scheduling DCI corresponding to the downlink data signal.

Supplement 17. The method according to supplement 16, wherein $N_{slot}^{subslot}$ is one of the following:

$$N_{slot}^{subslot} = \frac{14}{L_{subslot}^{symbol}},$$

$L_{subslot}^{symbol}$ referring to the number of symbols corresponding to the time unit;

$$N_{slot}^{subslot} = \left\lceil \frac{14}{L_{subslot}^{symbol}} \right\rceil,$$

$L_{subslot}^{symbol}$ referring to the number of longest symbols corresponding to the time unit; and $$N_{slot}^{subslot} = \left\lfloor \frac{14}{L_{subslot}^{symbol}} \right\rfloor,$$

$L_{subslot}^{symbol}$ s referring to the number of shortest symbols corresponding to the time unit.

Supplement 18. The method according to supplement 14, wherein the receiving the CSI report after the time unit n+k includes: receiving the CSI report at a time unit after the time unit n+k, the time unit after the time unit n+k being an earliest time unit in time units when (at which) CSI report is active after the time unit n+k.

Supplement 19. The method according to supplement 14, wherein the receiving the CSI report after the time unit n+k includes: receiving the CSI report at a time unit after the time unit n+k, the time unit after the time unit n+k being a time unit n+k+1; wherein the CSI report is active at the time unit n+k+1.

Supplement 20. The method according to supplement 14, wherein the receiving the CSI report after the time unit n+k includes: receiving the CSI report at a time unit after the time unit n+k, the time unit after the time unit n+k being an earliest time unit in time units when (at which) the CSI report is active after a time unit n+k+1.

Supplement 21. The method according to supplement 14, wherein the CSI report is not active at the time unit n+k+1.

Supplement 22. The method according to supplement 14, wherein that the network device transmits the downlink data signal at the time unit n refers to:
  that the network device transmits the downlink data signal ending at the time unit n.

Supplement 23. The method according to supplement 14, wherein the time unit is of a subslot, or the number of symbols included in the time unit is less than 14.

Supplement 24. A wireless communication method, including:
  receiving a downlink data signal by a terminal equipment at a time unit n, the downlink data signal including an activation/deactivation command acting on a secondary cell; and
  performing at least one of the following processing by the terminal equipment:
  applying corresponding actions not earlier than a time unit n+k+1;
  applying actions related to a deactivation timer of the secondary cell at the time unit n+k+1; and
  applying actions related to CSI report after a time unit n+k, the CSI report being related to or corresponding to the activation/deactivation command;
  the time unit referring to a time unit corresponding to transmission of an uplink control signal.

Supplement 25. The method according to supplement 24, wherein the k is related to a slot offset or offset between the downlink data signal and the uplink control signal carrying the HARQ-ACK information corresponding to the downlink data signal.

Supplement 26. The method according to supplement 24, wherein the k is obtained through calculation by the following formula:

$$k = k'_1 + 3 N_{slot}^{subframe, \mu};$$

where,
  $N_{slot}^{subframe, \mu}$ refers to the number of slots included in each subframe when the SCS configuration corresponding to the transmission of the uplink control signal is µ,
  and $k'_1$ refers to a slot offset or offset between the downlink data signal and the uplink control signal carrying the HARQ-ACK information corresponding to the downlink data signal.

Supplement 27. The method according to supplement 24, wherein the applying corresponding actions includes applying a corresponding SCell activation/deactivation action.

Supplement 28. The method according to supplement 24, wherein the applying corresponding actions does not include applying an action related to CSI report.

Supplement 29. The method according to supplement 24, wherein the applying corresponding actions does not include applying an action related to the SCell deactivation timer of the secondary cell.

Supplement 30. The method according to supplement 24, wherein the applying actions related to CSI report after the time unit n+k includes: applying the actions related to CSI report at a time unit after the time unit n+k, the time unit after the time unit n+k being an earliest time unit in time units when (at which) CSI report is active after the time unit n+k.

Supplement 31. The method according to supplement 24, wherein the applying actions related to CSI report after the time unit n+k includes: applying the actions related to CSI report at a time unit after the time unit n+k, the time unit after the time unit n+k being a time unit n+k+1; wherein the CSI report is active at the time unit n+k+1.

Supplement 32. The method according to supplement 24, wherein the applying actions related to CSI report after the time unit n+k includes: applying the actions related to CSI report at a time unit after the time unit n+k, the time unit after the time unit n+k being an earliest time unit in time units when (at which) the CSI report is active after a time unit n+k+1.

Supplement 33. The method according to supplement 32, wherein, the CSI report is not active at the time unit n+k+1.

Supplement 34. The method according to supplement 24, wherein that the terminal equipment receives the downlink data signal at the time unit n refers to:
  that the terminal equipment receives the downlink data signal ending at the time unit n.

Supplement 35. The method according to supplement 24, wherein the time unit is of a slot, or, the time unit includes 14 symbols.

Supplement 36. A wireless communication method, including:
  transmitting a downlink data signal by a network device at a time unit n, the downlink data signal including an activation/deactivation command acting on a secondary cell; and
  receiving CSI report by the network device after a time unit n+k, the CSI report being related to or corresponding to the activation/deactivation command, and the time unit referring to a time unit corresponding to reception of an uplink control signal.

Supplement 37. The method according to supplement 36, wherein the k is related to a slot offset or offset between the downlink data signal and the uplink control signal carrying the HARQ-ACK information corresponding to the downlink data signal.

Supplement 38. The method according to supplement 36, wherein the k is obtained through calculation by the following formula:

$$k=k'_1+3N_{slot}^{subframe,\mu};$$

where, $N_{slot}^{subframe,\mu}$ refers to the number of slots included in each subframe when the SCS configuration corresponding to the reception of the uplink control signal is μ, and $k'_1$ refers to a slot offset or offset between the downlink data signal and the uplink control signal carrying the HARQ-ACK information corresponding to the downlink data signal.

Supplement 39. The method according to supplement 36, wherein the receiving CSI report after the time unit n+k includes: receiving the CSI report at a time unit after the time unit n+k, the time unit after the time unit n+k being an earliest time unit in time units when (at which) the CSI report is active after a time unit n+k.

Supplement 40. The method according to supplement 36, wherein the receiving CSI report after the time unit n+k includes: receiving the CSI report at a time unit after time unit n+k, the time unit after the time unit n+k being a time unit n+k+1; wherein, the CSI report is active at the time unit n+k+1.

Supplement 41. The method according to supplement 36, wherein the receiving CSI report after the time unit n+k includes: receiving the CSI report at a time unit after the time unit n+k, the time unit after the time unit n+k being an earliest time unit in time units when (at which) the CSI report is active after a time unit n+k+1.

Supplement 42. The method according to supplement 36, wherein, the CSI report is not active at the time unit n+k+1.

Supplement 43. The method according to supplement 36, wherein that the terminal equipment transmits the downlink data signal at the time unit n refers to:

that the terminal equipment transmits the downlink data signal ending at the time unit n.

Supplement 44. The method according to supplement 36, wherein the time unit is of a slot, or, the time unit includes 14 symbols.

Supplement 45. A terminal equipment, including a memory and a processor, the memory storing a computer program, and the processor being configured to execute the computer program to carry out the wireless communication method as described in any one of supplements 1-13 and 24-35.

Supplement 46. A network device, including a memory and a processor, the memory storing a computer program, and the processor being configured to execute the computer program to carry out the wireless communication method as described in any one of supplements 14-23 and 36-44.

Supplement 47. A communication system, including a terminal equipment and a network device, wherein, the terminal equipment is configured to carry out the method as described in any one of supplements 1-13, and the network device is configured to carry out the method as described in any one of supplements 14-23, or the terminal equipment is configured to carry out the method as described in any one of supplements 24-35, and the network device is configured to carry out the method as described in any one of supplements 36-44.

What is claimed is:

1. A wireless communication device, comprising:
a transmitter configured to transmit, to another wireless communication device, a downlink data signal at a time unit n, the downlink data signal comprising an activation or deactivation command acting on a secondary cell; and
a receiver configured to receive an uplink control signal carrying the HARQ-ACK information corresponding to the downlink data signal, transmission of the uplink control signal corresponding to a time unit which is a time unit n+k+1 or a time unit n+k, the time unit n+k+1 is time that the another wireless communication device applies corresponding action not earlier than or the another wireless communication device applies applying actions related to a deactivation timer of the secondary cell, the time unit n+k relating to timing that the another wireless communication device applies actions related to a CSI report which is related to or corresponds to the activation or deactivation command, wherein
the k is obtained through calculation by using a formula as below:

$$k=k'_1+3N_{slot}^{subframe,\mu};$$

where,
$N_{slot}^{subframe,\mu}$ refers to the number of slots contained in each subframe when SCS (subcarrier spacing) configuration corresponding to transmission of the uplink control signal is μ, and
$k'_1$ refers to the slot offset or offset between the downlink data signal and the uplink control signal carrying the HARQ-ACK information corresponding to the downlink data signal.

2. A wireless communication device, comprising:
a receiver configured to receive a downlink data signal at a time unit n, the downlink data signal comprising an activation or deactivation command acting on a secondary cell; and
processor configured to perform at least one of the following processing:
applying corresponding actions not earlier than a time unit n+k+1;
applying actions related to a deactivation timer of the secondary cell at the time unit n+k+1; and
applying actions related to a CSI report after a time unit n+k, wherein, the CSI report is related to or corresponds to the activation or deactivation command,
each of the time unit n, the time unit n+k, and the time unit n+k+1 referring to a time unit corresponding to transmission of an uplink control signal,
wherein the k is obtained through calculation by using a formula as below:

$$k=k'_1+3N_{slot}^{subframe,\mu};$$

where,
$N_{slot}^{subframe,\mu}$ refers to the number of slots contained in each subframe when SCS (subcarrier spacing) configuration corresponding to transmission of an uplink control signal is μ, $k'_1$ refers to the slot offset or offset between the downlink data signal and the uplink control signal carrying the HARQ-ACK information corresponding to the downlink data signal.

3. The device according to claim 2, wherein the k is related to a slot offset or offset between the downlink data signal and an uplink control signal carrying HARQ-ACK information corresponding to the downlink data signal.

4. The device according to claim 2, wherein the applying actions related to the CSI report after a time unit n+k comprises: applying actions related to the CSI report at a time unit after the time unit n+k, the time unit after the time unit n+k being the time unit n+k+1; wherein the CSI report is active at the time unit n+k+1.

5. The device according to claim 2, wherein the applying actions related to the CSI report after a time unit n+k comprises: applying actions related to the CSI report at a time unit after the time unit n+k, the time unit after the time unit n+k being a time unit after the time unit n+k+1, the time unit being earliest in time units when the CSI report is active.

6. The device according to claim 5, wherein, the CSI report is not active at the time unit n+k+1.

7. The device according to claim 2, wherein that the receiver receiving a downlink data signal at a time unit n refers to that,
the receiver receives the downlink data signal ending at the time unit n.

* * * * *